（12）United States Patent
Kawakami

(10) Patent No.: US 9,071,124 B2
(45) Date of Patent: Jun. 30, 2015

(54) MOVER AND LINEAR MOTOR

(71) Applicant: HITACHI METALS, LTD., Tokyo (JP)

(72) Inventor: Makoto Kawakami, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/217,979

(22) Filed: Mar. 18, 2014

(65) Prior Publication Data

US 2014/0225459 A1    Aug. 14, 2014

Related U.S. Application Data

(62) Division of application No. 13/145,938, filed as application No. PCT/JP2010/050761 on Jan. 22, 2010, now Pat. No. 8,723,376.

(30) Foreign Application Priority Data

Jan. 23, 2009    (JP) ................... 2009-013259

(51) Int. Cl.
| | |
|---|---|
| *H02K 41/02* | (2006.01) |
| *H02K 41/03* | (2006.01) |
| *H02K 1/14* | (2006.01) |
| *H02K 1/27* | (2006.01) |
| *H02K 7/08* | (2006.01) |

(52) U.S. Cl.
CPC ............. *H02K 41/02* (2013.01); *H02K 1/146* (2013.01); *H02K 1/278* (2013.01); *H02K 7/08* (2013.01); *H02K 41/031* (2013.01); *H02K 2213/03* (2013.01); *H02K 2207/03* (2013.01)

(58) Field of Classification Search
USPC ............... 310/15, 22–23, 27, 12.24–12.26
See application file for complete search history.

(56) References Cited

U.S. PATENT DOCUMENTS

| | | | |
|---|---|---|---|
| 4,760,294 A | 7/1988 | Hansen | |
| 4,945,268 A | 7/1990 | Nihei et al. | |
| 4,945,269 A | 7/1990 | Kamm | |
| 6,787,945 B2 | 9/2004 | Miyata | |
| 6,849,969 B2* | 2/2005 | Kang et al. ................. | 310/12.25 |
| 6,870,284 B2* | 3/2005 | Uchida ....................... | 310/12.24 |
| 7,250,696 B2* | 7/2007 | Kim et al. .................. | 310/12.05 |
| 7,501,724 B2 | 3/2009 | Tang et al. | |

(Continued)

FOREIGN PATENT DOCUMENTS

| | | |
|---|---|---|
| JP | H8-275495 A | 10/1996 |
| JP | 2001-119919 | 4/2001 |

(Continued)

*Primary Examiner* — Thanh Lam

(74) *Attorney, Agent, or Firm* — Muncy, Geissler, Olds & Lowe, P.C.

(57) ABSTRACT

A mover, in which at each outer surface of a cornered tubular inner yoke, a flat plate magnet magnetized from inside to outside in a direction perpendicular to the outer surface, a flat plate magnet magnetized in an axial direction of the inner yoke, a flat plate magnet magnetized from outside to inside in the direction perpendicular to the outer surface, and a flat plate magnet magnetized in the axial direction of the inner yoke are alternately provided in this order, is passed through an armature in which a first single pole unit and a second single pole unit rotated by 90° with respect to the first single pole unit are alternately stacked, thus forming a linear motor. Windings are collectively wound around core portions of the first single pole unit. Positions of the magnets provided at the outer surfaces of the inner yoke are deviated from each other.

6 Claims, 29 Drawing Sheets

(56) References Cited

U.S. PATENT DOCUMENTS

| | | |
|---|---|---|
| 7,884,509 B2 * | 2/2011 | Mukaide ............. 310/12.25 |
| 8,198,760 B2 * | 6/2012 | Sugita et al. ........ 310/12.21 |
| 8,569,916 B2 * | 10/2013 | Sugita et al. ............ 310/29 |
| 2002/0053835 A1 | 5/2002 | Joong et al. |
| 2002/0070612 A1 * | 6/2002 | Joong et al. ............. 310/12 |
| 2003/0127917 A1 | 7/2003 | Kang et al. |
| 2005/0046282 A1 | 3/2005 | Tang et al. |
| 2006/0175908 A1 | 8/2006 | Lee et al. |
| 2007/0296282 A1 | 12/2007 | Tang et al. |
| 2008/0218004 A1 | 9/2008 | Mukaide |
| 2008/0258567 A1 | 10/2008 | Mukaide |
| 2009/0033157 A1 | 2/2009 | Maemura et al. |
| 2011/0221283 A1 | 9/2011 | Kawakami |

FOREIGN PATENT DOCUMENTS

| | | |
|---|---|---|
| JP | 2001-286122 A | 10/2001 |
| JP | 2002-142439 A | 5/2002 |
| JP | 2002-359962 A | 12/2002 |
| JP | 2003-032995 A | 1/2003 |
| JP | 2003-070226 A | 3/2003 |
| JP | 2003-224960 | 8/2003 |
| JP | 2003-244924 A | 8/2003 |
| JP | 2003-274630 A | 9/2003 |
| JP | 2004-153896 A | 5/2004 |
| JP | 2004-236498 A | 8/2004 |
| JP | 2005-102486 A | 4/2005 |
| JP | 2005-223997 A | 8/2005 |
| JP | 2005-287185 A | 10/2005 |
| JP | 2005-295675 A | 10/2005 |
| JP | 2007-312501 A | 11/2007 |
| JP | 2008-220020 A | 9/2008 |
| JP | 2008-220076 A | 9/2008 |
| JP | 2008-228545 A | 9/2008 |
| JP | 2008-289344 A | 11/2008 |
| TW | M243846 | 9/2004 |

* cited by examiner

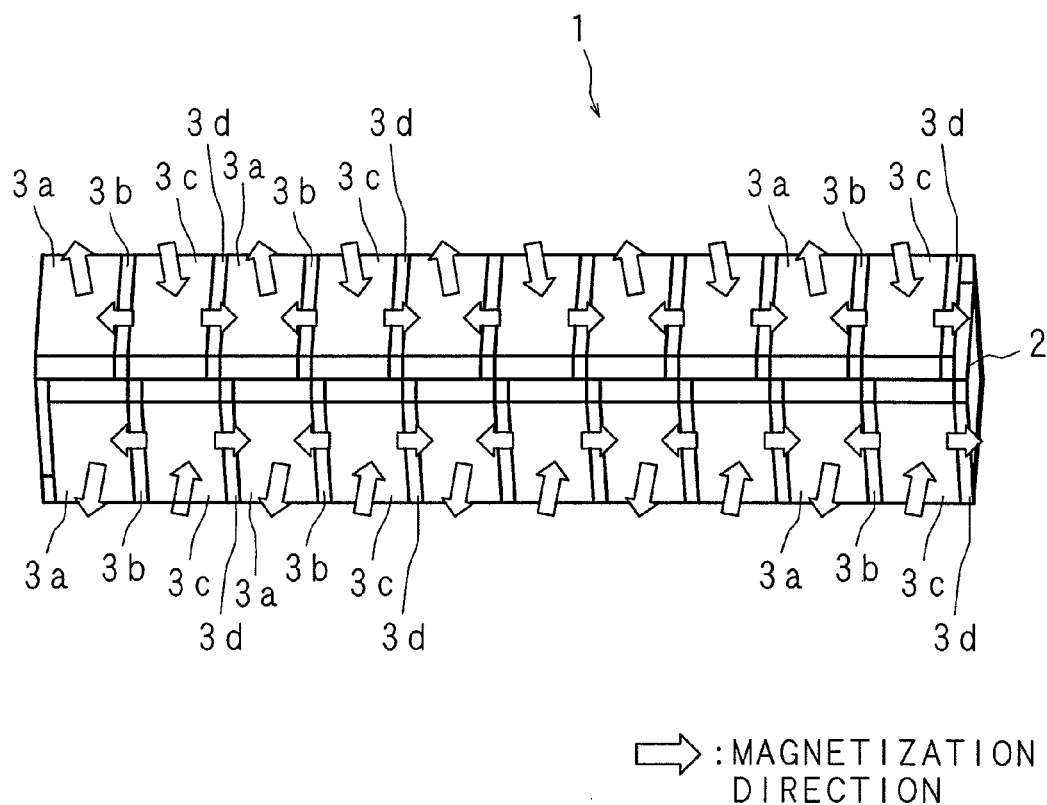

MOVER AND LINEAR MOTOR

This application is a divisional of U.S. application Ser. No. 13/145,938, which was filed on Jul. 22, 2011, and which claims priority under 35 U.S.C. 119 to Japanese Application 2009-013259, which was filed on Jan. 23, 2009 and to PCT International Application No. PCT/JP2010/050761 which has an International filing date of Jan. 22, 2010 and which are both herein incorporated by reference.

BACKGROUND

1. Technical Field

The present invention relates to a mover provided with a plurality of flat plate permanent magnets at outer surfaces of a cornered tubular inner yoke, and to a linear motor formed by a combination of the mover and an armature (stator).

2. Description of Related Art

In a vertical movement device of a drill used in a borer for an electronic circuit board or the like or a vertical movement mechanism in a robot of a pick-and-place type (which picks a component and places the component at a predetermined position), for example, high-speed movement and high-precision positioning are required. Accordingly, such requirements cannot be satisfied by a conventional method for converting an output of a rotation motor into a parallel motion (vertical motion) using a ball screw because the movement speed is low in the conventional method.

Therefore, for such a vertical movement, the use of a linear motor capable of directly deriving a parallel motion output is being promoted. Various types of structures have been proposed for a linear motor in which a rectangular permanent magnet structure provided with a large number of plate-like permanent magnets is used as a mover, an armature having a winding to flow the current is used as a stator, and the mover is arranged in the portion of hole of the stator (see Japanese Patent Application Laid-Open No. 2002-359962 and Japanese Patent Application Laid-Open No. 2008-228545, for example).

SUMMARY

In a conventional linear motor, response is quick as compared with the case where a ball screw is used, but since the mass of a mover is large, it is impossible to realize a response speed at a required level even though it is possible to ensure sufficient thrust force. A structure of a linear motor suitable for speed enhancement is a movable magnet type structure; however, when a magnetic pole pitch is large, the amount of agnetic flux traveling around to reach an inner yoke on a back surface of a magnet is increased, and the volume of the inner yoke is increased, thus increasing the weight of the mover. On the other hand, when the magnetic pole pitch is reduced, a winding structure in an armature is complicated, which makes it difficult to realize a linear motor having smaller size and higher output. Furthermore, a linear motor is influenced by its own weight when it is used for a vertical movement; hence, weight reduction is increasingly desired, and in addition, high rigidity is required for a mover in order to realize a high-speed operation.

The present invention has been made in view of the above-described circumstances, and its object is to provide a mover having a large amount of generated magnetic flux, reduced weight, and high rigidity.

Another object of the present invention is to provide a mover that reduces thrust ripple and enables a smooth movement.

Still another object of the present invention to provide a linear motor having a structure in which magnetic saturation is unlikely to occur, and capable of realizing high-speed responsiveness and enhancing conversion efficiency of the motor to realize a high power density.

Still yet another object of the present invention is to provide a linear motor in which reduction in thrust ripple and/or detent force is enabled, a smooth movement is allowed, and improvement in position accuracy is also promoted.

Even yet another object of the present invention is to provide a two-phase drive linear motor that enables a smooth movement of a mover, which is substantially similar to that of a mover of a three-phase drive linear motor.

A mover according to the present invention is a mover of a linear motor, which is provided with a plurality of flat plate permanent magnets at outer surfaces of a cornered tubular inner yoke made of a soft magnetic material, wherein the plurality of flat plate permanent magnets include flat plate magnets magnetized in a direction perpendicular to the outer surface of the inner yoke and flat plate magnets magnetized in an axial direction of the inner yoke, and the flat plate magnets magnetized in the perpendicular direction and the flat plate magnets magnetized in the axial direction are alternately and continuously arranged at each outer surface of the inner yoke along the axial direction of the inner yoke, wherein the flat plate magnets magnetized in the perpendicular direction include first flat plate magnets magnetized from inside of the inner yoke to outside thereof and second flat plate magnets magnetized from the outside of the inner yoke to the inside thereof, and the first and second flat plate magnets are alternately arranged along the axial direction of the inner yoke, wherein the flat plate magnets magnetized in the axial direction are each magnetized from the adjacent second flat plate magnet to the adjacent first flat plate magnet, and wherein positions of the plurality of flat plate permanent magnets provided at the outer surfaces of the inner yoke are deviated from each other.

In the mover of the present invention, at each outer surface of the cornered tubular inner yoke made of a soft magnetic material, the flat plate magnet magnetized from inside to outside in the direction perpendicular to the outer surface, the flat plate magnet magnetized in the axial direction of the inner yoke, the flat plate magnet magnetized from outside to inside in the direction perpendicular to the outer surface, and the flat plate magnet magnetized in the axial direction of the inner yoke are arranged in this order along the axial direction of the inner yoke, and the positions of the flat plate magnets provided at the outer surfaces of the inner yoke are deviated from each other. Accordingly, since the flat plate magnets magnetized in the axial direction are each provided between the two flat plate magnets magnetized in the direction perpendicular to the outer surface, magnetic flux generated in the inner yoke located inside the mover is reduced, thus making it possible to reduce the thickness of the inner yoke and to reduce the resulting weight. Further, since the flat plate magnets can be provided at the respective outer surfaces of the inner yoke in a divided manner, fabrication flexibility is extremely high as compared with a cylindrical mover, and the use of high-performance magnets is also enabled, thereby increasing rigidity. Furthermore, since the positions of the magnets provided at the outer surfaces are deviated from each other in the axial direction (movement direction), thrust ripple and/or detent force are/is reduced, and cogging is suppressed, thus enabling a smooth movement.

In the mover according to the present invention, the positions of the plurality of flat plate permanent magnets provided at the outer surfaces of the inner yoke are deviated from each other in the axial direction by a dimension equal to or less than ¼ of a total length of one of the first flat plate magnets, one of the second flat plate magnets and two of the flat plate magnets magnetized in the axial direction.

In the mover of the present invention, the positions of the plurality of flat plate magnets provided at the outer surfaces, i.e., a field cycle of a set of four flat plate magnets, are displaced (deviated) by a dimension equal to or less than ¼ of the above length. When no deviation is made, large thrust ripple is generated to make it difficult to enable a smooth movement, which might adversely affect accurate positioning. However, when a field cycle of a set of four flat plate magnets is deviated by a dimension greater than ¼ of the above length, both of south and north poles of the magnets of the mover might face the same armature magnetic poles, and the south and north poles might be inverted to make it impossible to obtain sufficient thrust force. Hence, the field cycle is displaced (deviated) by a dimension equal to or less than ¼ of the above length, thus reducing thrust ripple and realizing a smooth linear movement.

Note that in the mover of the present invention, the flat plate magnets magnetized in the axial direction of the inner yoke may be removed from the above-described structure. Specifically, in such a variation, at each outer surface of a cornered tubular inner yoke made of a soft magnetic material, first flat plate magnets magnetized from inside to outside in a direction perpendicular to the outer surface and second flat plate magnets magnetized from outside to inside in the direction perpendicular to the outer surface are alternately arranged along an axial direction of the inner yoke, and positions of the flat plate magnets provided at the outer surfaces of the inner yoke are deviated from each other. For example, the positions of the flat plate magnets provided at the outer surfaces of the inner yoke are deviated from each other in the axial direction by a dimension equal to or less than ¼ of a total length of one of the first flat plate magnets and one of the second flat plate magnets. This variation also achieves effects similar to those achieved in the example of the foregoing structure provided with a plurality of sets of the flat plate magnets in which each set includes four flat plate magnets.

A mover according to the present invention is a mover of a linear motor, which is provided with a plurality of flat plate permanent magnets at four outer surfaces of a quadrangular tubular inner yoke made of a soft magnetic material, wherein the plurality of flat plate permanent magnets include flat plate magnets magnetized in a direction perpendicular to the outer surface of the inner yoke and flat plate magnets magnetized in an axial direction of the inner yoke, and the flat plate magnets magnetized in the perpendicular direction and the flat plate magnets magnetized in the axial direction are alternately and continuously arranged at each outer surface of the inner yoke along the axial direction of the inner yoke, wherein the flat plate magnets magnetized in the perpendicular direction include first flat plate magnets magnetized from inside of the inner yoke to outside thereof and second flat plate magnets magnetized from the outside of the inner yoke to the inside thereof, and the first and second flat plate magnets are alternately arranged along the axial direction of the inner yoke, wherein the flat plate magnets magnetized in the axial direction are each magnetized from the adjacent second flat plate magnet to the adjacent first flat plate magnet, and wherein positions of the plurality of flat plate permanent magnets provided at one pair of the adjacent outer surfaces of the inner yoke and positions of the plurality of flat plate permanent magnets provided at the other pair of the adjacent outer surfaces of the inner yoke are deviated from each other by ¼ of a total length of one of the first flat plate magnets, one of the second flat plate magnets and two of the flat plate magnets magnetized in the axial direction.

In the mover of the present invention, at each outer surface of the quadrangular tubular inner yoke made of a soft magnetic material, the first flat plate magnet magnetized from inside to outside in the direction perpendicular to the outer surface, the flat plate magnet magnetized in the axial direction of the inner yoke, the second flat plate magnet magnetized from outside to inside in the direction perpendicular to the outer surface, and the flat plate magnet magnetized in the axial direction of the inner yoke are arranged in this order along the axial direction of the inner yoke, and the positions of the plurality of flat plate magnets provided at one pair of the adjacent outer surfaces of the inner yoke (i.e., the magnets opposed to one of windings of an armature) and the positions of the plurality of flat plate magnets provided at the other pair of the adjacent outer surfaces of the inner yoke (i.e., the magnets opposed to the other winding of the armature) are deviated from each other by ¼ of a total length of one of the first flat plate magnets, one of the second flat plate magnets and two of the flat plate magnets magnetized in the axial direction (i.e., by an electrical angle of 90°). Hence, drive currents by which a phase difference of 90° occurs are passed through the respective windings of the armature, thereby continuously generating thrust force for the mover and realizing a smooth movement by two-phase drive.

In the mover according to the present invention, a linear guide rail for supporting the mover is provided at a corner portion of the outer surface of the inner yoke so as to be extended in the axial direction of the inner yoke.

In the mover of the present invention, the linear guide rail is provided at the corner portion of the outer surface of the inner yoke so as to be extended in the axial direction thereof, thus supporting the mover. Hence, the mover is pressed laterally through the linear guide rail, thereby making it possible to suppress vibrations such as flexural vibration and resonant vibration and to realize a high-speed linear movement in which no oscillation occurs.

A linear motor according to the present invention includes: a mover in which a plurality of flat plate permanent magnets at outer surfaces of a cornered tubular inner yoke made of a soft magnetic material include flat plate magnets magnetized in a direction perpendicular to the outer surface of the inner yoke and flat plate magnets magnetized in an axial direction of the inner yoke, the flat plate magnets magnetized in the perpendicular direction and the flat plate magnets magnetized in the axial direction are alternately and continuously arranged at each outer surface of the inner yoke along the axial direction of the inner yoke, the flat plate magnets magnetized in the perpendicular direction include first flat plate magnets magnetized from inside of the inner yoke to outside thereof and second flat plate magnets magnetized from the outside of the inner yoke to the inside thereof, the first and second flat plate magnets are alternately arranged along the axial direction of the inner yoke, the flat plate magnets magnetized in the axial direction are each magnetized from the adjacent second flat plate magnet to the adjacent first flat plate magnet, and positions of the plurality of flat plate permanent magnets provided at the outer surfaces of the inner yoke are deviated from each other; and an armature in which the armature includes a first single pole unit made of a soft magnetic material and having a rectangular opening, a yoke portion located outwardly of the opening, and a core portion extended from the yoke portion to the opening, and a second single pole unit made of a soft magnetic material and having a rectangular opening, a yoke portion located outwardly of the opening, and a core portion that is located at a position rotated by 90° from a position of the core portion of the first single pole unit and that is extended from the yoke portion to the opening, the first and second single pole units are alternately stacked, and windings are wound around a plurality of the core portions of the first single pole unit and/or a plurality of the core portions of the second single pole unit, wherein the mover is passed through the opening of the first single pole unit and the opening of the second single pole unit.

A linear motor according to the present invention includes: a mover in which a plurality of flat plate permanent magnets at outer surfaces of a cornered tubular inner yoke made of a soft magnetic material include first flat plate magnets magnetized from inside of the inner yoke to outside thereof and second flat plate magnets magnetized from the outside of the inner yoke to the inside thereof, the first and second flat plate magnets are alternately arranged at each outer surface of the inner yoke along the axial direction of the inner yoke, and positions of the plurality of flat plate permanent magnets provided at the outer surfaces of the inner yoke are deviated from each other; and an armature in which the armature includes a first single pole unit made of a soft magnetic material and having a rectangular opening, a yoke portion located outwardly of the opening, and a core portion extended from the yoke portion to the opening, and a second single pole unit made of a soft magnetic material and having a rectangular opening, a yoke portion located outwardly of the opening, and a core portion that is located at a position rotated by 90° from a position of the core portion of the first single pole unit and that is extended from the yoke portion to the opening, the first and second single pole units are alternately stacked, and windings are wound around a plurality of the core portions of the first single pole unit and/or a plurality of the core portions of the second single pole unit, wherein the mover is passed through the opening of the first single pole unit and the opening of the second single pole unit.

The linear motor of the present invention is formed so that the foregoing mover is passed through the armature in which the first single pole unit made of a soft magnetic material and having the rectangular opening, the yoke portion located outwardly of the opening, and the core portion extended from the yoke portion to the opening, and the second single pole unit made of a soft magnetic material and having a structure rotated by 90° from that of the first single pole unit are alternately stacked, and the windings are collectively wound around the core portions of one of the single pole units. Since a reduction in weight of the mover is enabled, a response speed of the mover is increased. Further, a winding structure in the armature is simple, thus enabling size reduction. Furthermore, since the positions of the magnets provided at the outer surfaces of the mover are deviated in the axial direction (movement direction), thrust ripple and/or detent force are/is reduced, thus enabling a high-speed and stable movement of the mover.

A linear motor according to the present invention includes: a mover in which a plurality of flat plate permanent magnets at four outer surfaces of a quadrangular tubular inner yoke made of a soft magnetic material include flat plate magnets magnetized in a direction perpendicular to the outer surface of the inner yoke and flat plate magnets magnetized in an axial direction of the inner yoke, the flat plate magnets magnetized in the perpendicular direction and the flat plate magnets magnetized in the axial direction are alternately and continuously arranged at each outer surface of the inner yoke along the axial direction of the inner yoke, the flat plate magnets magnetized in the perpendicular direction include first flat plate magnets magnetized from inside of the inner yoke to outside thereof and second flat plate magnets magnetized from the outside of the inner yoke to the inside thereof, the first and second flat plate magnets are alternately arranged along the axial direction of the inner yoke, the flat plate magnets magnetized in the axial direction are each magnetized from the adjacent second flat plate magnet to the adjacent first flat plate magnet, and positions of the plurality of flat plate permanent magnets provided at one pair of the adjacent outer surfaces of the inner yoke and positions of the plurality of flat plate permanent magnets provided at the other pair of the adjacent outer surfaces of the inner yoke are deviated from each other by ¼ of a total length of one of the first flat plate magnets, one of the second flat plate magnets and two of the flat plate magnets magnetized in the axial direction; and an armature in which the armature includes a first single pole unit made of a soft magnetic material and having a rectangular opening, a yoke portion located outwardly of the opening, and a core portion extended from the yoke portion to the opening, and a second single pole unit made of a soft magnetic material and having a rectangular opening, a yoke portion located outwardly of the opening, and a core portion that is located at a position rotated by 90° from a position of the core portion of the first single pole unit and that is extended from the yoke portion to the opening, the first and second single pole units are alternately stacked, and first and second windings are wound around two areas of a plurality of the core portions of the first single pole unit or a plurality of the core portions of the second single pole unit, wherein the mover is passed through the opening of the first single pole unit and the opening of the second single pole unit so that the plurality of flat plate permanent magnets at said one pair of the outer surfaces are opposed to the first winding and the plurality of flat plate permanent magnets at the other pair of the outer surfaces are opposed to the second winding, and wherein currents by which a phase difference of an electrical angle of 90° occurs are applied to the first and second windings.

In the linear motor of the present invention, the positions of the flat plate magnets provided in the mover and opposed to one of the windings of the armature, and the positions of the flat plate magnets provided in the mover and opposed to the other winding of the armature are deviated from each other by ¼ of a field cycle (i.e., by an electrical angle of 90°). Hence, drive currents (e.g., sinusoidal wave current and cosine wave current) by which a phase deviation of 90° occurs are passed through the respective windings of the armature, thereby continuously generating thrust force for the mover by a single core unit, and enabling a smooth movement by two-phase drive.

In the linear motor according to the present invention, the positions of the plurality of flat plate permanent magnets provided at said, one pair of the outer surfaces are deviated from each other, and the positions of the plurality of flat plate permanent magnets provided at the other pair of the outer surfaces are deviated from each other.

In the linear motor of the present invention, while the relationship of deviation between the positions of the flat plate magnets provided so as to be opposed to one of the windings and the positions of the flat plate magnets provided so as to be opposed to the other winding is maintained, the positions of the flat plate magnets provided at one pair of the outer surfaces are deviated from each other, and the positions of the flat plate magnets provided at the other pair of the outer surfaces are deviated from each other, thus reducing harmonic components of thrust ripple and detent force in a two-phase drive system.

In the linear motor according to the present invention, spacing between the first and second single pole units, which are adjacent to each other, is adjusted.

In the linear motor of the present invention, the spacing between the first and second single pole units of the armature (i.e., spacing between magnetic pole teeth) is adjusted, thereby reducing harmonic components of thrust ripple and detent force in a two-phase drive system.

In the linear motor according to the present invention, the inner yoke has a quadrangular tubular shape, the openings each have a quadrangular shape, the first and second single pole units each have a quadrangular shape, and an angle of 45° is formed between a direction of a side of each of the first and second single pole units and a direction of a side of the opening.

In the linear motor of the present invention, the mover having a quadrangular tubular shape is passed through the quadrangular openings of the quadrangular first and second single pole units of the armature, and the directions of the sides of the openings are inclined by 45° with respect to the directions of the sides of the first and second single pole units. Hence, the flow of magnetic flux through the armature is smoothed, thus making it difficult to cause magnetic saturation. Moreover, effective formation of the core portions is enabled even when the shape of the armature is reduced in size.

In the linear motor according to the present invention; a spacer made of a soft magnetic material is interposed between the stacked first and second single pole units so that the core portions of the first and second single pole units do not come into contact with each other.

In the linear motor of the present invention, the spacer having a frame-like shape is provided between the first and second single pole units. Hence, prevention of contact between the core portions of the first single pole unit and the core portions of the second single pole unit (i.e., avoidance of magnetic short circuit) is realized with a simple structure. Besides, the spacing between the first and second single pole units is easily adjustable.

In a magnet row A having a cyclic magnetic flux density distribution, assume that a cyclic direction is an x direction and a magnetic flux density at a position x is B(x) (where $B(x)=(B(x)_x, B(x)_y, B(x)_z)$). Then, $2\tau(2\tau=\lambda)$ by which $B(x)=B(x+2\tau)$ is defined as a field cycle (where $\tau$ represents a magnetic pole pitch).

Furthermore, in magnet rows $A_1$ and $A_2$ each having a cyclic magnetic flux density distribution, assume that a cyclic direction is an x direction, a magnetic flux density of $A_1$ at a position x is $B_1(x)$, and a magnetic flux density of $A_2$ at the position x is $B_2(x)$. Then, a magnetic flux density distribution $B_2'$ provided when the magnet row $A_2$, for example, is moved by d in the x direction in a magnetic row arrangement in which $B_1(x)=B_1(x+2\tau_1)$, $B_2(x)=B_2(x+2\tau_2)$, and $\tau 1=\tau 2$ is represented as follows: $B_2'=B_2(x-d)$ where d is defined as a deviation. In this case, $-\lambda/4<d<\lambda/4$, and $-\tau/2<d<\tau/2$.

In the present invention, a reduction in magnetic flux generated in the inner yoke inside the mover is enabled, thus making it possible to reduce the thickness of the inner yoke and to reduce the weight of the resulting linear motor. Further, since the magnets can be provided at the outer surfaces of the inner yoke in a divided manner, selectivity of usable magnets is improved, thus enabling enhancement of rigidity of the mover. Hence, implementation of a high-speed linear motor is enabled. Furthermore, since the positions of the flat plate magnets provided at the outer surfaces are deviated from each other in the axial direction (movement direction), reduction in thrust ripple and/or detent force is enabled, thus making it possible to realize a smooth movement of the mover and to implement the linear motor with improved positional accuracy.

Besides, in the present invention, the mover is formed so that the arrangement of the flat plate magnets at one pair of the adjacent outer surfaces of the quadrangular tubular inner yoke (i.e., at the two surfaces opposed to one of the windings of the armature) and the arrangement of the flat plate magnets at the other pair of the adjacent outer surfaces of the inner yoke (i.e., at the two surfaces opposed to the other winding of the armature) are deviated from each other by ¼ of a length of one set of the flat plate magnets (i.e., by $\lambda/4$ where $\lambda$ denotes a field cycle, or by an electrical angle of 90°), and currents by which a phase difference of 90° occurs are passed through one of the windings and the other winding in the armature, thus making it possible to realize a movement of the mover by two-phase drive and to provide the linear motor, the length of which is shorter than that of a three-phase drive linear motor.

Moreover, in the present invention, the arrangements of the flat plate magnets at one pair of the outer surfaces and at the other pair of the outer surfaces and/or the spacing between magnetic pole teeth in the armature are/is adjusted, thereby making it possible to solve a problem (e.g., large thrust ripple and detent force) in a two-phase drive linear motor and to realize a smooth movement substantially similar to that of a three-phase drive linear motor.

The above and further objects and features will more fully be apparent from the following detailed description with accompanying drawings.

BRIEF DESCRIPTION OF THE SEVERAL VIEWS OF THE DRAWINGS

FIG. 1 is a perspective view illustrating a structure of a mover according to a first embodiment.

DETAILED DESCRIPTION

Figure 2A:
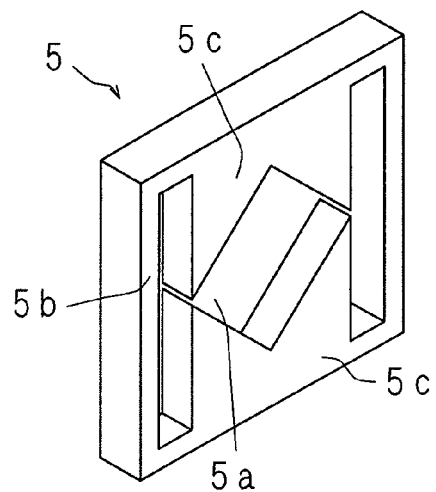
FIG. 2A is a perspective view illustrating a structure of an armature used for a linear motor.

Hereinafter, the present invention will be described based on the drawings illustrating embodiments thereof.

(First Embodiment)

FIG. 1 is a perspective view illustrating a structure of a mover according to a first embodiment of the present invention. A mover 1 is formed so that four types of flat plate magnets 3a, 3b, 3c and 3d are alternately provided in this order at each outer surface of a quadrangular tubular inner yoke 2, made of a soft magnetic material, along an axial direction of the inner yoke 2 (i.e., along a movement direction of the mover 1). In FIG. 1, open arrows indicate magnetization directions of the respective flat plate magnets 3a, 3b, 3c and 3d. Each flat plate magnet (first flat plate magnet) 3a is a flat plate permanent magnet magnetized from inside to outside in a direction perpendicular to the outer surface of the inner yoke 2. On the other hand, each flat plate magnet (second flat plate magnet) 3c is a flat plate permanent magnet magnetized from outside to inside in a direction perpendicular to the outer surface of the inner yoke 2. Hence, the magnetization directions of the flat plate magnets 3a and 3c are perpendicular to the outer surface of the inner yoke 2 and are opposite to each other.

Further, the flat plate magnets 3b and 3d are flat plate permanent magnets each magnetized from the adjacent flat plate magnet 3c to the adjacent flat plate magnet 3a along the axial direction of the inner yoke 2 (i.e., along a longitudinal direction of the outer surface thereof). Hence, the magnetization directions of the flat plate magnets 3b and 3d correspond to the axial direction of the inner yoke 2 and are opposite to each other.

Furthermore, positions of the flat plate magnets 3a, 3b, 3c and 3d provided at the outer surfaces of the inner yoke 2 are deviated from each other by a dimension equal to or less than ¼ of a total length of one set of the four types of the flat plate magnets 3a, 3b, 3c and 3d. In the example illustrated in FIG. 1, at the four outer surfaces of the quadrangular tubular inner yoke 2, the positions of the flat plate magnets 3a, 3b, 3c and 3d provided at the two opposing outer surfaces coincide with each other, but the positions of the flat plate magnets 3a, 3b, 3c and 3d provided at the two adjacent outer surfaces are deviated by a length of the flat plate magnet 3b or 3d.

Figure 2B:
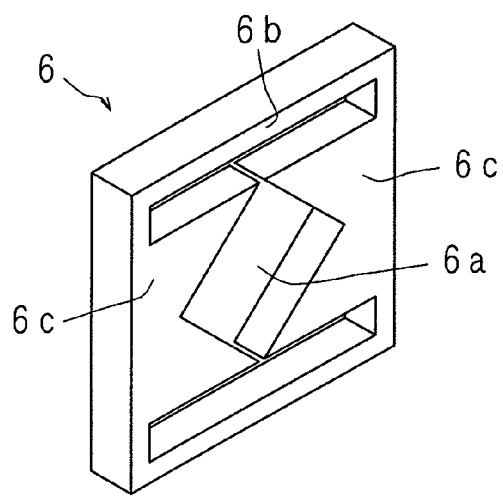
FIG. 2B is a perspective view illustrating a structure of the armature used for a linear motor.
Figure 2C:
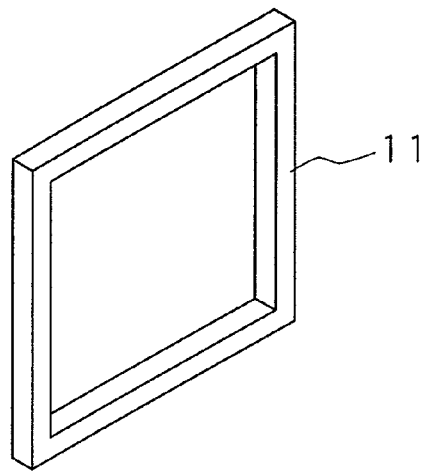
FIG. 2C is a perspective view illustrating a structure of the armature used for a linear motor.
Figure 3A:
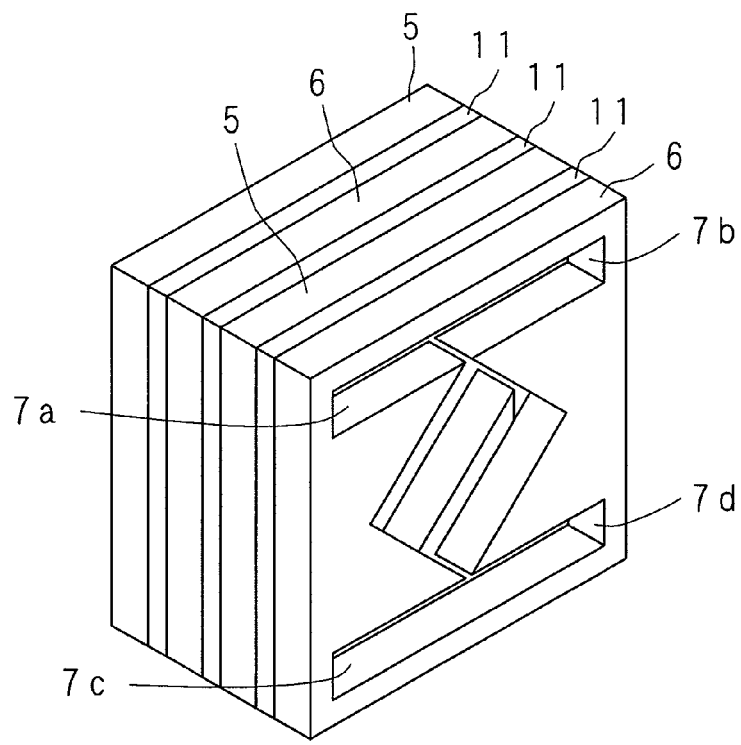
FIG. 3A is a perspective view illustrating a structure of the armature used for a linear motor.
Figure 3B:
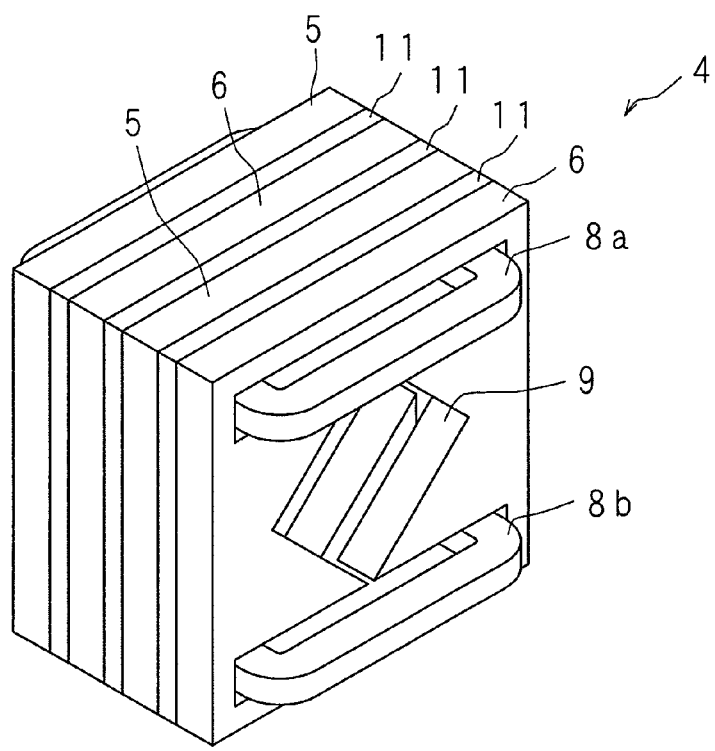
FIG. 3B is a perspective view illustrating a structure of the armature used for a linear motor.

FIGS. 2A to 2C and FIGS. 3A and 3B are perspective views each illustrating a structure of an armature used for a linear motor according to the present invention, and FIGS. 2A to 2C and FIG. 3A are partial schematic diagrams thereof while FIG. 3B is an overall schematic diagram thereof.

An armature 4 is formed so that a quadrangular plate first single pole unit 5 illustrated in FIG. 2A and a quadrangular plate second single pole unit 6 illustrated in FIG. 2B are alternately arranged, and a frame-like spacer unit 11 such as one illustrated in FIG. 2C is inserted between the first and second single pole units 5 and 6 adjacent to each other (see FIG. 3A).

The first single pole unit 5 is made of a soft magnetic material and has a quadrangular opening 5a through which the mover 1 passes; a yoke portion 5b serving as a frame body located outwardly of the opening 5a; and a core portion 5c extended from the yoke portion 5b toward the opening 5a. An angle of 45° is formed between the direction of a side of the quadrangular plate first single pole unit 5 and that of a side of the opening 5a. Further, the second single pole unit 6 is made of a soft magnetic material and has: a quadrangular opening 6a through which the mover 1 passes; a yoke portion 6b serving as a frame body located outwardly of the opening 6a; and a core portion 6c extended from the yoke portion 6b toward the opening 6a. An angle of 45° is formed between the direction of a side of the quadrangular plate second single pole unit 6 and that of a side of the opening 6a. The second single pole unit 6 has a structure rotated by 90° from that of the first single pole unit 5.

The spacer unit 11 made of a soft magnetic material and consisting only of yokes is inserted between the first and second single pole units 5 and 6 adjacent to each other, thus preventing the core portions of the single pole units 5 and 6 from coming into contact with each other. Further, a single-phase unit such as one illustrated in FIG. 3A is formed by alternately arranging and stacking the above-described first single pole unit 5, second single pole unit 6 and spacer unit 11 in the following order: the first single pole unit 5, the spacer unit 11, the second single pole unit 6, the spacer unit 11, . . . . In the single-phase unit, the yoke portions 5b and 6b of the first and second single pole units 5 and 6 adjacent to each other are brought into contact with each other, but the core portions 5c and 6c thereof are not brought into contact with each other, so that a gap exists therebetween, thus avoiding magnetic short circuit.

A winding 8a is collectively wound around the core portions 5c (each corresponding to the upper core portion 5c in FIG. 2A) of the first single pole units 5 so as to be passed through gap portions 7a and 7b common to the first and second single pole units 5 and 6; in addition, a winding 8b is collectively wound around the other core portions 5c (each corresponding to the lower core portion 5c in FIG. 2A) of the first single pole units 5 so as to be passed through gap portions 7c and 7d common to the first and second single pole units 5 and 6. Furthermore, the windings 8a and 8b are connected so that energization directions of the windings 8a and 8b are opposite to each other (see FIG. 3B).

Figure 4:
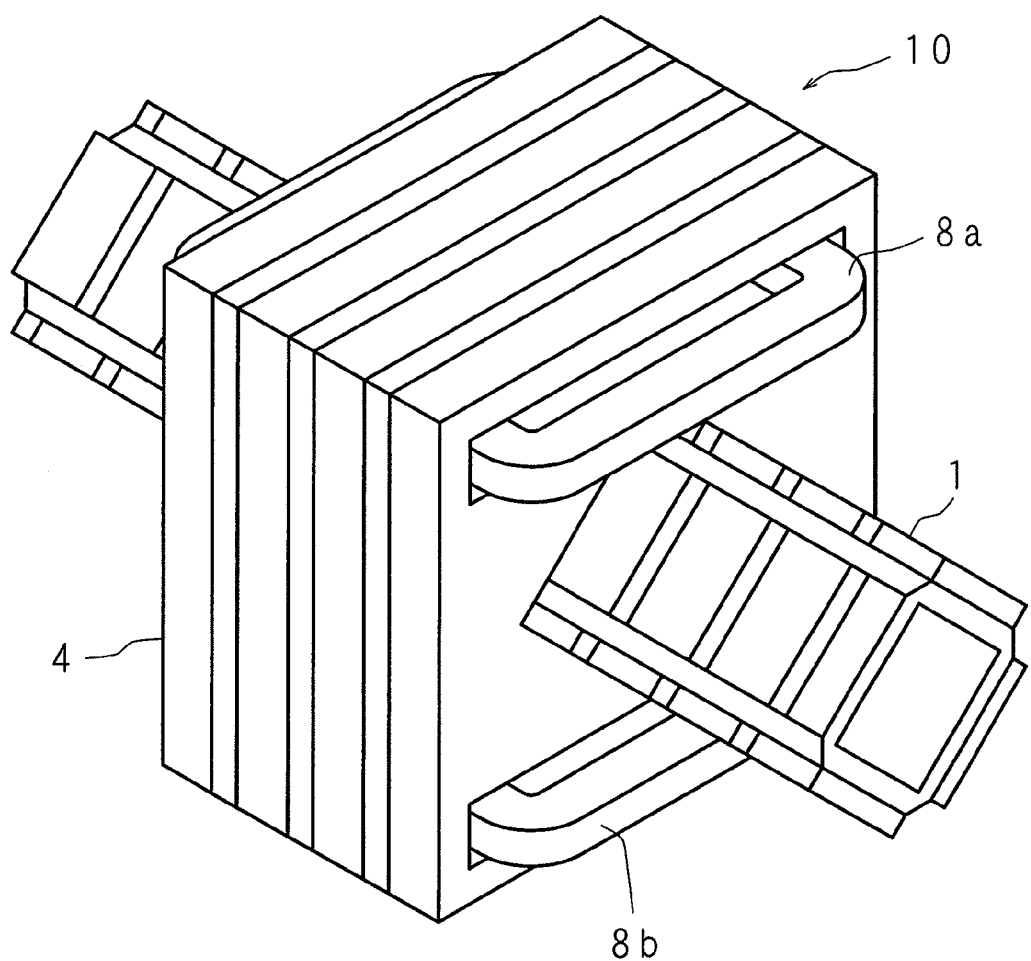
FIG. 4 is a perspective view illustrating a structure of a linear motor according to the first embodiment.
Figure 5:
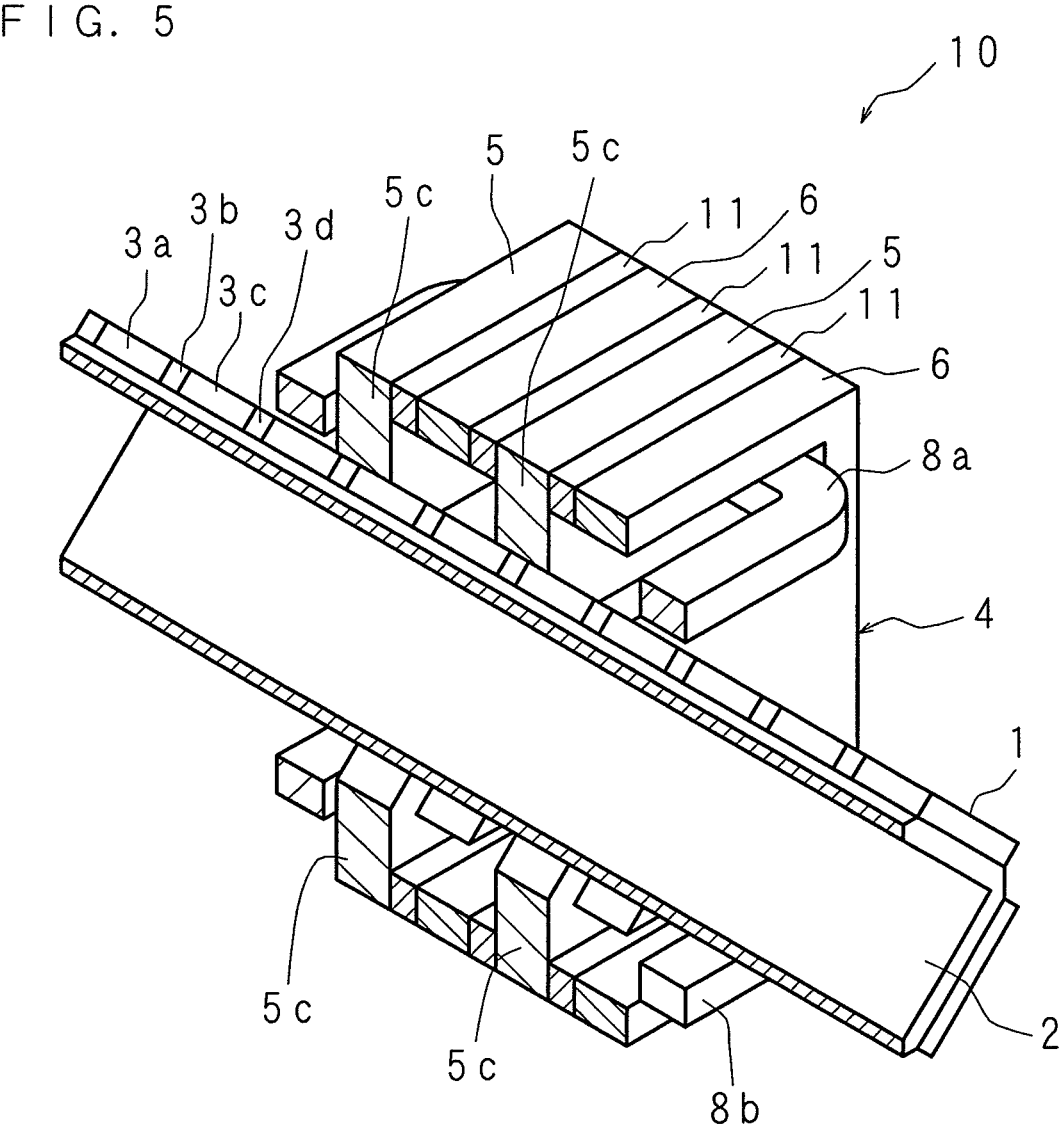
FIG. 5 is a partially broken perspective view illustrating the structure of the linear motor according to the first embodiment.

Moreover, the foregoing mover 1 illustrated in FIG. 1 is passed through a hollow portion 9 formed by the continuous openings 5a and 6a of the armature 4 illustrated in FIG. 3B, thus forming a single-phase drive linear motor (single-phase unit) 10 according to the first embodiment. FIG. 4 is a perspective view illustrating a structure of the linear motor 10 according to the present invention, and FIG. 5 is a partially broken perspective view illustrating the structure of the linear motor 10.

In such a linear motor, the armature 4 functions as a stator. Further, currents are passed through the windings 8a and 8b in opposite directions, thus causing a reciprocating linear motion of the mover 1, passed through the hollow portion 9 of the armature 4, with respect to the armature 4 (stator).

Figure 6:
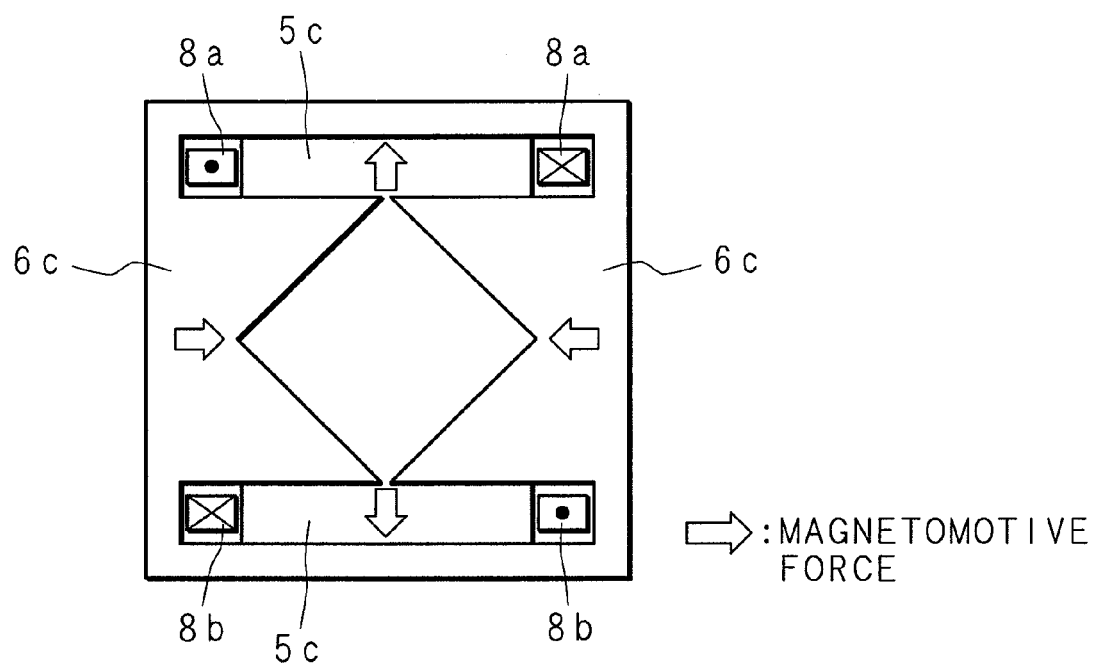
FIG. 6 is a cross-sectional view illustrating a flow of the current and magnetomotive force in an armature.

FIG. 6 is a cross-sectional view illustrating a flow of the current and magnetomotive force in the armature 4. In FIG. 6, "●(direction of applied current from the rear of the plane to the front thereof)" and "×(direction of applied current from the front of the plane to the rear thereof" indicate directions of current to the windings 8a and 8b, and open arrows indicate directions of magnetomotive force applied to the core portions 5c and 6c due to coil energization. By passing currents through the windings 8a and 8b in opposite directions, magnetic fields are generated in all the core portions 5c and 6c of the first and second single pole units 5 and 6.

Note that in the foregoing example, the spacer unit 11 having a frame-like shape and consisting only of yokes is inserted between the single pole units adjacent to each other; thus, even when the single pole units have a uniform thickness as a whole, the core portions of the single pole units are prevented from coming into contact with each other. According to this example, for each single pole unit, the thickness of the core portion does not have to be smaller than that of the yoke portion and thus no additional process is necessary, so that the use of the single pole units having a uniform thickness as a whole is enabled, thereby simplifying a fabrication process.

On the other hand, the single pole units may be formed so that the thickness of the core portion is made smaller than that of the yoke portion in each single pole unit and the core portions of the single pole units do not come into contact with each other when the resulting single pole units are stacked. In such an example, the foregoing spacer unit 11 is unnecessary.

For a conventional cylindrical linear motor, a structure in which a radially magnetized cylindrical magnet is adhered to a solid inner yoke or a structure in which an axially magnetized cylindrical magnet is adhered to a solid inner yoke, for example, has been used. In such a structure, the inner yoke is large and the mass of a mover is increased, thus making it difficult to achieve a high-speed responsiveness. On the other hand, in the mover 1 described above, the inner yoke 2 is hollow; furthermore, a reduction in magnetic flux generated inside the inner yoke 2 is enabled, and a reduction in thickness of the cornered tubular inner yoke 2 is enabled, thus enabling a reduction in weight of the mover 1. Hence, an increase in the response speed of the mover 1 is enabled.

Further, examples of methods for reducing the thickness of an inner yoke of a mover include a method for reducing a magnet pole pitch; however, when a pole pitch is reduced, the number of areas where windings are located is increased in a structure of a conventional armature, and the resulting shape tends to increase in size. On the other hand, in the armature 4, a winding is not wound for each pole but the windings 8a and 8b are collectively wound; therefore, even when a magnetic pole pitch is small, a winding structure is not complicated but is simply provided, thus facilitating size reduction.

Furthermore, since the mover 1 has a rectangular cross-sectional shape (quadrangular cross-sectional shape in the foregoing example) in the linear motor 10, magnets can be provided at a plurality of surfaces (four surfaces in the foregoing example) in a divided manner, and in addition, the use of flat plate magnets is enabled. Hence, as compared with a cylindrical linear motor, fabrication flexibility, including selection of magnets to be used, is extremely high, and the fabrication of the mover 1 having high rigidity can be easily carried out.

Moreover, the positions of the flat plate magnets 3a, 3b, 3c and 3d provided at the adjacent outer surfaces of the inner yoke 2 of the mover 1 are deviated from each other in the axial direction of the inner yoke 2 (i.e., in the movement direction of the mover 1). Hence, the effect of reducing thrust ripple and/or detent force can be achieved, thereby making it possible to eliminate cogging and to realize a smooth linear movement of the mover 1.

In addition, the directions of sides of the openings 5a and 6a of the single pole units 5 and 6 are inclined by 45° with respect to the directions of sides of main bodies of the first and second single pole units 5 and 6. Hence, the flow of magnetic flux through the armature 4 is smoothed, thus making it difficult to cause magnetic saturation.

Note that although five sets of the flat plate magnets 3a, 3b, 3c and 3d, i.e., a total of twenty flat plate magnets, are provided sequentially in a continuous manner at each outer surface of the inner yoke 2 in the foregoing embodiment, such a structure is provided by way of example, and the number of the flat plate magnets may be any number. Further, although two sets of the first and second single pole units 5 and 6 are alternately arranged, this arrangement is provided by way of example, and the number of sets may be any number.

Furthermore, although the shape of the inner yoke 2 is a quadrangular tubular shape in the foregoing embodiment, this shape is provided by way of example, and the inner yoke 2 may have a different polygonal tubular shape such as an octagonal tubular shape.

Besides, although the windings 8a and 8b are collectively wound around the core portions 5c of the first single pole units 5 in the foregoing embodiment, windings may be collectively wound around the core portions 6c of the second single pole units 6.

In the foregoing embodiment, at the four outer surfaces of the quadrangular tubular inner yoke 2, the positions of the flat plate magnets 3a, 3b, 3c and 3d provided at the two opposing outer surfaces coincide with each other, and the positions of the flat plate magnets 3a, 3b, 3c and 3d provided at the two adjacent outer surfaces are deviated from each other. However, the positions of the flat plate magnets 3a, 3b, 3c and 3d provided at the four outer surfaces of the inner yoke 2 may be slightly deviated from each other so that all the positions are different. It is to be noted that even in such a structure example, a maximum deviation amount is equal to or less than ¼ of a length of one set of the four flat plate magnets 3a, 3b, 3c and 3d.

The single-phase linear motor (single-phase unit) has been described thus far; however, for example, when a three-phase drive linear motor formed, three of the foregoing armatures may be provided linearly at intervals in accordance with the following expression: magnetic pole pitch×(n+⅓) or magnetic pole pitch×(n+⅔) where n is an integer, and the mover may be passed through these armatures. Note that in such a case, the integer n may be set in consideration of space in which windings are contained.

(Second Embodiment)

FIG. 7, FIGS. 8A to 8C and FIG. 9 are perspective views illustrating structures of a mover 21, an armature 4 and a linear motor 30 according to the second embodiment, respectively. In FIG. 7, FIGS. 8A to 8C and FIG. 9, the same components as those in FIG. 1, FIGS. 2A to 2C and FIGS. 3A and 3B are identified by the same reference numerals, and the description thereof will be omitted.

Figure 7:
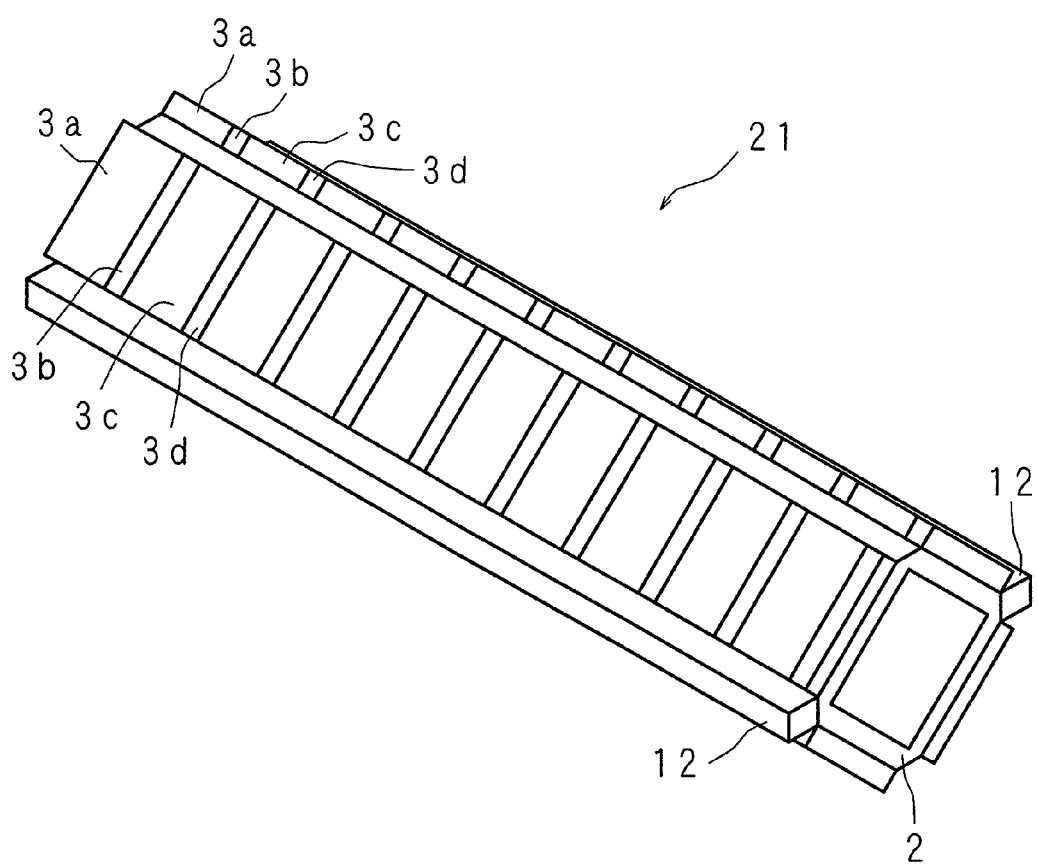
FIG. 7 is a perspective view illustrating a structure of a mover according to a second embodiment.
Figure 8A:
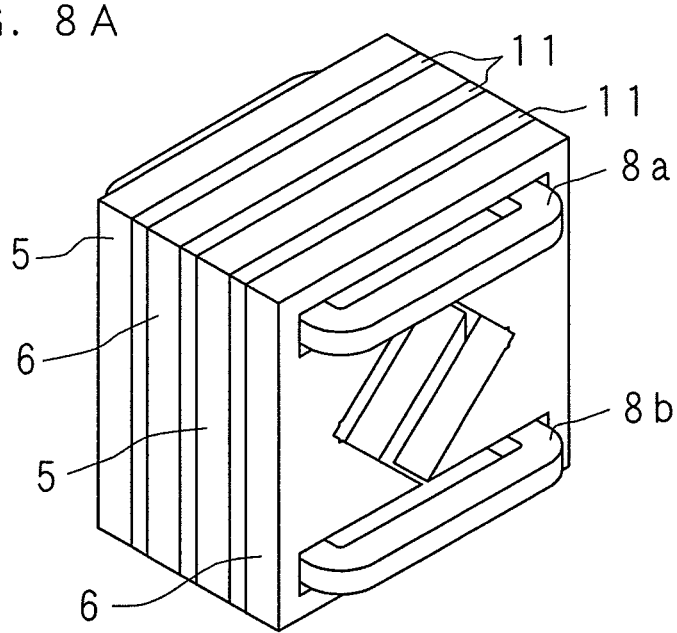
FIG. 8A is a perspective view illustrating a structure of an armature according to the second embodiment.
Figure 8B:
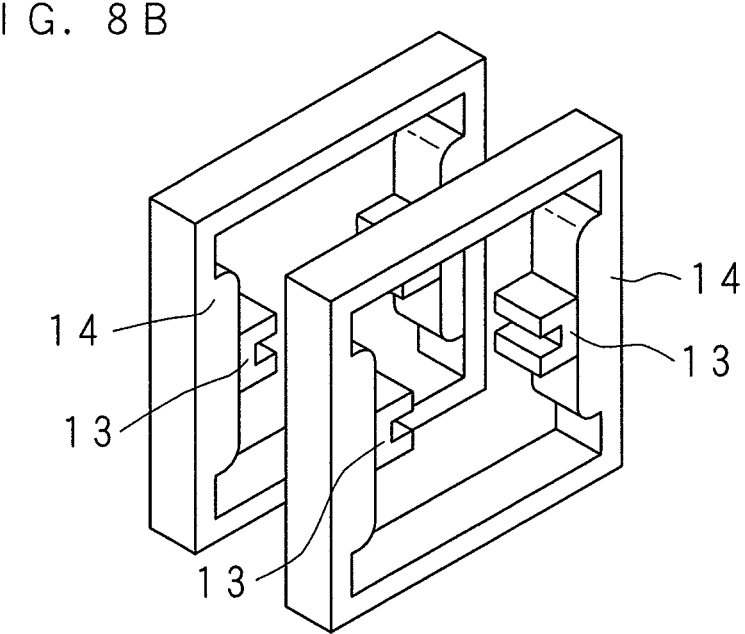
FIG. 8B is a perspective view illustrating a structure of the armature according to the second embodiment.
Figure 8C:
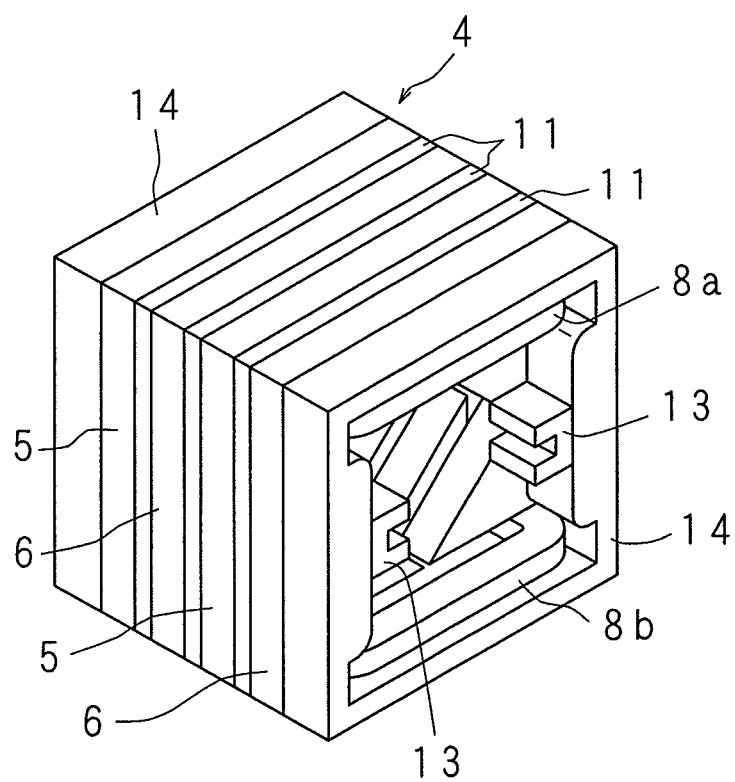
FIG. 8C is a perspective view illustrating a structure of the armature according to the second embodiment.
Figure 9:
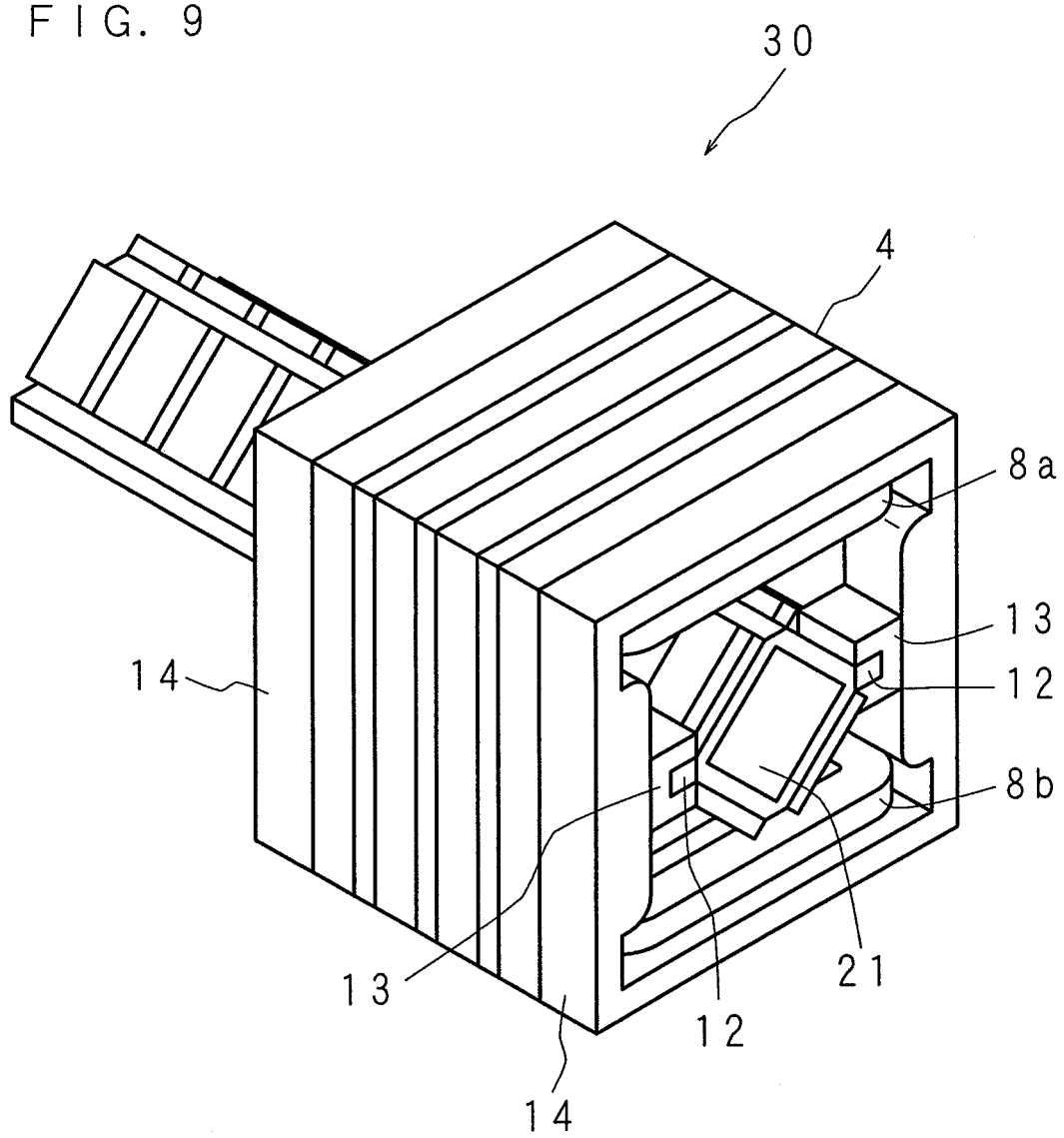
FIG. 9 is a perspective view illustrating a structure of a linear motor according to the second embodiment.

In the mover 21 illustrated in FIG. 7, linear guide rails 12 are provided at two corner portions of outer surfaces of an inner yoke 2 so as to be extended axially. Moreover, cut-outs for allowing the linear guide rails 12 to pass through openings of first and second single pole units 5 and 6 constituting the armature 4 may be provided. At front and rear surfaces of a main body illustrated in FIG. 8A in which the four single pole units are stacked, mover support frames 14 illustrated in FIG. 8B and equipped with linear guide sliders 13 are provided, thus forming the armature 4 of a single-phase unit (see FIG. 8C). Further, the mover 21 illustrated in FIG. 7 is passed through the armature 4 illustrated in FIG. 8C, thus forming the single-phase drive linear motor (single-phase unit) 30 (see FIG. 9).

In the second embodiment, the mover 21 is supported by being pressed laterally through the linear guide rails 12. Hence, further enhancement in rigidity is enabled. Furthermore, vibrations such as flexural vibration and resonant vibration can be suppressed by the linear guide rails 12. Accordingly, even when a high-speed movement is made, no large vibration occurs, thus making it possible to realize a stable high-speed linear movement in which no oscillation occurs.

(Third Embodiment)

Figure 10:
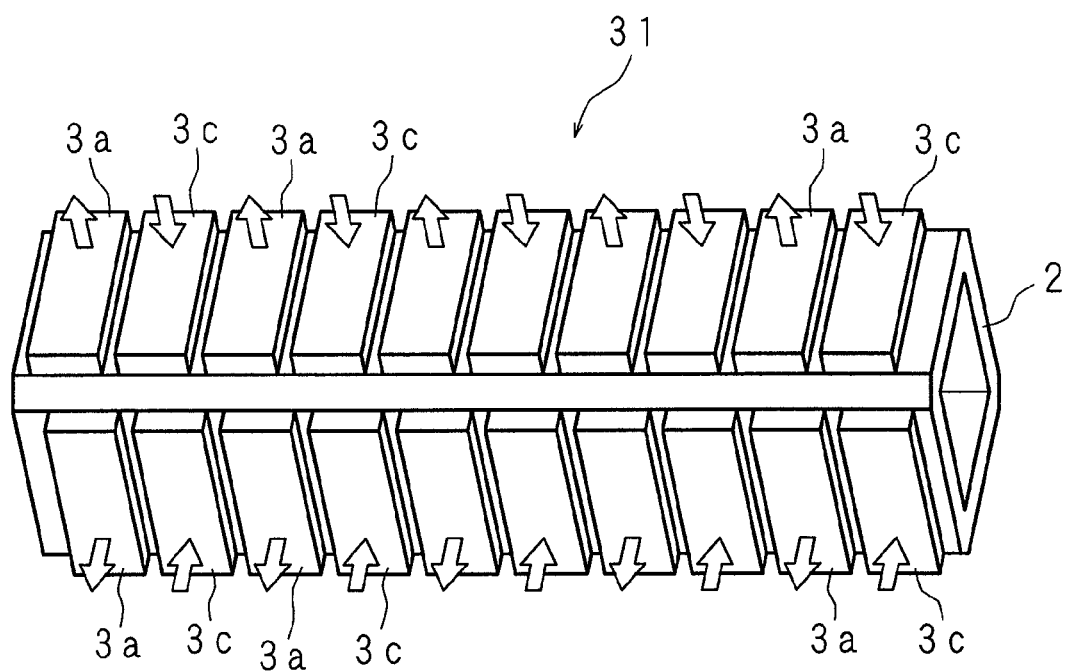
FIG. 10 is a perspective view illustrating a structure of over according to a third embodiment.

A third embodiment is a variation of the first embodiment described above. FIG. 10 is a perspective view illustrating a structure of a mover according to the third embodiment. A mover 31 according to the third embodiment has a structure in which the flat plate magnets 3b and 3d magnetized in the axial direction are removed from the mover 1 (see FIG. 1) according to the first embodiment. Specifically, the mover 31 is formed so that at each outer surface of the quadrangular tubular inner yoke 2 made of a soft magnetic material, the two types of the flat plate magnets 3a and 3c are alternately provided in this order along the axial direction of the inner yoke 2 (i.e., along a movement direction of the mover 31). In FIG. 10, open arrows indicate magnetization directions of the respective flat plate magnets 3a and 3c. Each flat plate magnet (first flat plate magnet) 3a is a flat plate permanent magnet magnetized from inside to outside in a direction perpendicular to the outer surface of the inner yoke 2. On the other hand, each flat plate magnet (second flat plate magnet) 3c is a flat plate permanent magnet magnetized from outside to inside in a direction perpendicular to the outer surface of the inner yoke 2. Hence, the magnetization directions of the flat plate magnets 3a and 3c are perpendicular to the outer surface of the inner yoke 2 and are opposite to each other.

Furthermore, positions of the flat plate magnets 3a and 3c provided at the outer surfaces of the inner yoke 2 are deviated from each other by a dimension equal to or less than ¼ of a total length of one set of the two types of the flat plate magnets 3a and 3c. In the example illustrated in FIG. 10, at the four outer surfaces of the quadrangular tubular inner yoke 2, the positions of the flat plate magnets 3a and 3c provided at the two opposing outer surfaces coincide with each other, but the positions of the flat plate magnets 3a and 3c provided at the two adjacent outer surfaces are deviated from each other.

A structure of an armature according to the third embodiment is similar to that of the armature 4 according to the first embodiment described above (see FIGS. 2A to 2C and FIGS. 3A and 3B).

Also in a linear motor according to the third embodiment, the armature 4 functions as a stator, and currents are passed through the windings 8a and 8b in opposite directions, thus causing a reciprocating linear motion of the mover 31, passed through the hollow portion 9 of the armature 4, with respect to the armature 4 (stator). In this case, the positions of the flat plate magnets 3a and 3c provided at the adjacent outer surfaces of the inner yoke 2 of the mover 31 are deviated from each other in the axial direction of the inner yoke 2 (i.e., in the movement direction of the mover 31). Hence, the effect of reducing thrust ripple and/or detent force can be achieved, thereby eliminating cogging and realizing a smooth linear movement of the mover 31.

Note that although five sets of the flat plate magnets 3a and 3c, i.e., a total of ten flat plate magnets, are provided sequentially in a continuous manner at each outer surface, such a structure is provided by way of example, and the number of the flat plate magnets may be any number. Furthermore, although the shape of the inner yoke 2 is a quadrangular tubular shape, this shape is provided by way of example, and the inner yoke 2 may have a different polygonal tubular shape such as an octagonal tubular shape. At the four outer surfaces of the quadrangular tubular inner yoke 2, the positions of the flat plate magnets 3a and 3c provided at the two opposing outer surfaces coincide with each other, and the positions of the flat plate magnets 3a and 3c provided at the two adjacent outer surfaces are deviated from each other. However, the positions of the flat plate magnets 3a and 3c provided at the four outer surfaces of the inner yoke 2 may be slightly deviated from each other so that all the positions are different. It is to be noted that even in such a structure example, a maximum deviation amount is equal to or less than ¼ of a length of one set of the two flat plate magnets 3a and 3c.

(Fourth Embodiment)

In a fourth embodiment, two-phase drive is carried out by a single core unit. In the foregoing first or third embodiment, three-phase drive is carried out, and therefore, three armatures are linearly provided so that the mover is passed therethrough. Accordingly, there arises a problem that the resulting linear motor has a large total length. In the fourth embodiment described below, two-phase drive is carried out by a single core unit, thus significantly solving the problem of a large total length, which has been present in a three-phase separate independent type linear motor.

Figure 11:
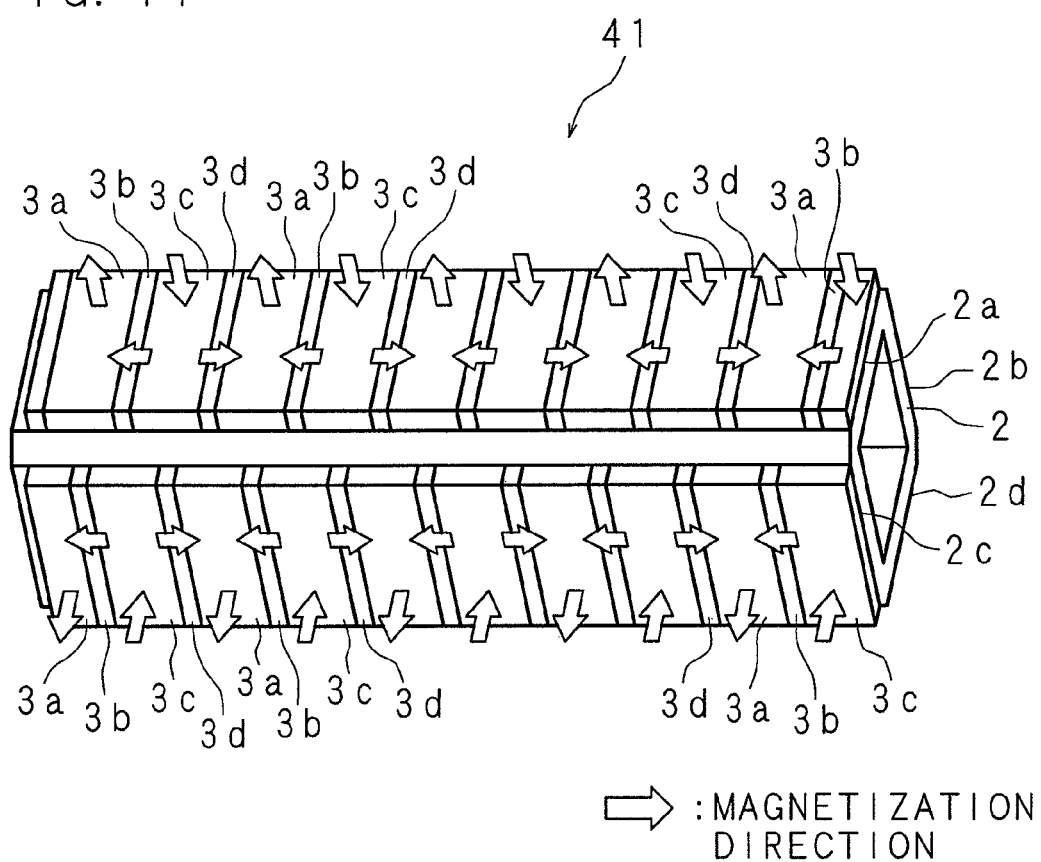
FIG. 11 is a perspective view illustrating a structure of a mover according to a fourth embodiment.

FIG. 11 is a perspective view illustrating a structure of a mover according to the fourth embodiment of the present invention. A mover 41 is formed so that four types of flat plate magnets 3a, 3b, 3c and 3d are alternately provided in this order at each of four outer surfaces 2a, 2b, 2c and 2d of a quadrangular tubular inner yoke 2, made of a soft magnetic material, along an axial direction of the inner yoke 2 (i.e., along a movement direction of the mover 41). In FIG. 11, open arrows indicate magnetization directions of the respective flat plate magnets 3a, 3b, 3c and 3d. Each flat plate magnet (first flat plate magnet) 3a is a flat plate permanent magnet magnetized from inside to outside in a direction perpendicular to the outer surface of the inner yoke 2. On the other hand, each flat plate magnet (second flat plate magnet) 3c is a flat plate permanent magnet magnetized from outside to inside in a direction perpendicular to the outer surface of the inner yoke 2. Hence, the magnetization directions of the flat plate magnets 3a and 3c are perpendicular to the outer surface of the inner yoke 2 and are opposite to each other.

Further, the flat plate magnets 3b and 3d are flat plate permanent magnets each magnetized from the adjacent flat plate magnet 3c to the adjacent flat plate magnet 3a along the axial direction of the inner yoke 2 (i.e., along a longitudinal direction of the outer surface thereof). Hence, the magnetization directions of the flat plate magnets 3b and 3d correspond to the axial direction of the inner yoke 2 and are opposite to each other.

Furthermore, positions of the flat plate magnets 3a, 3b, 3c and 3d provided at the two upper adjacent outer surfaces 2a and 2h of the inner yoke 2, and positions of the flat plate magnets 3a, 3b, 3c and 3d provided at the two lower adjacent outer surfaces 2c and 2d of the inner yoke 2 are deviated from each other by a dimension of ¼ of a total length of one set of the four types of the flat plate magnets 3a, 3b, 3c and 3d (i.e., by $\lambda/4$ where $\lambda$ denotes a field cycle, or by an electrical angle of 90°).

A structure of an armature according to the fourth embodiment is similar to that of the armature 4 according to the first embodiment described above (see FIGS. 2A to 2C and FIGS. 3A and 3B), and therefore, the detailed description thereof will be omitted.

Figure 12:
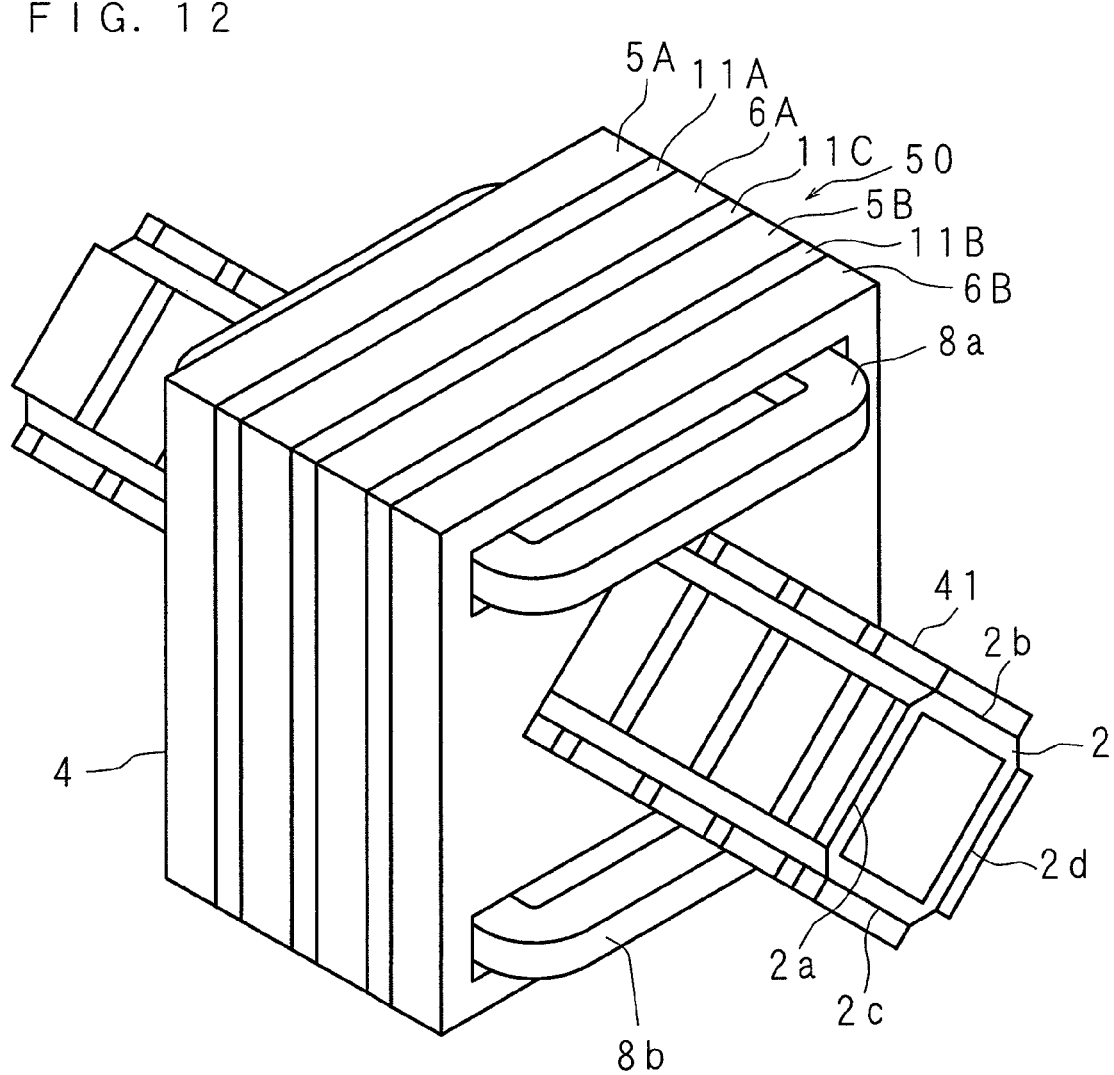
FIG. 12 is a perspective view illustrating a structure of a linear motor according to the fourth embodiment.
Figure 13:
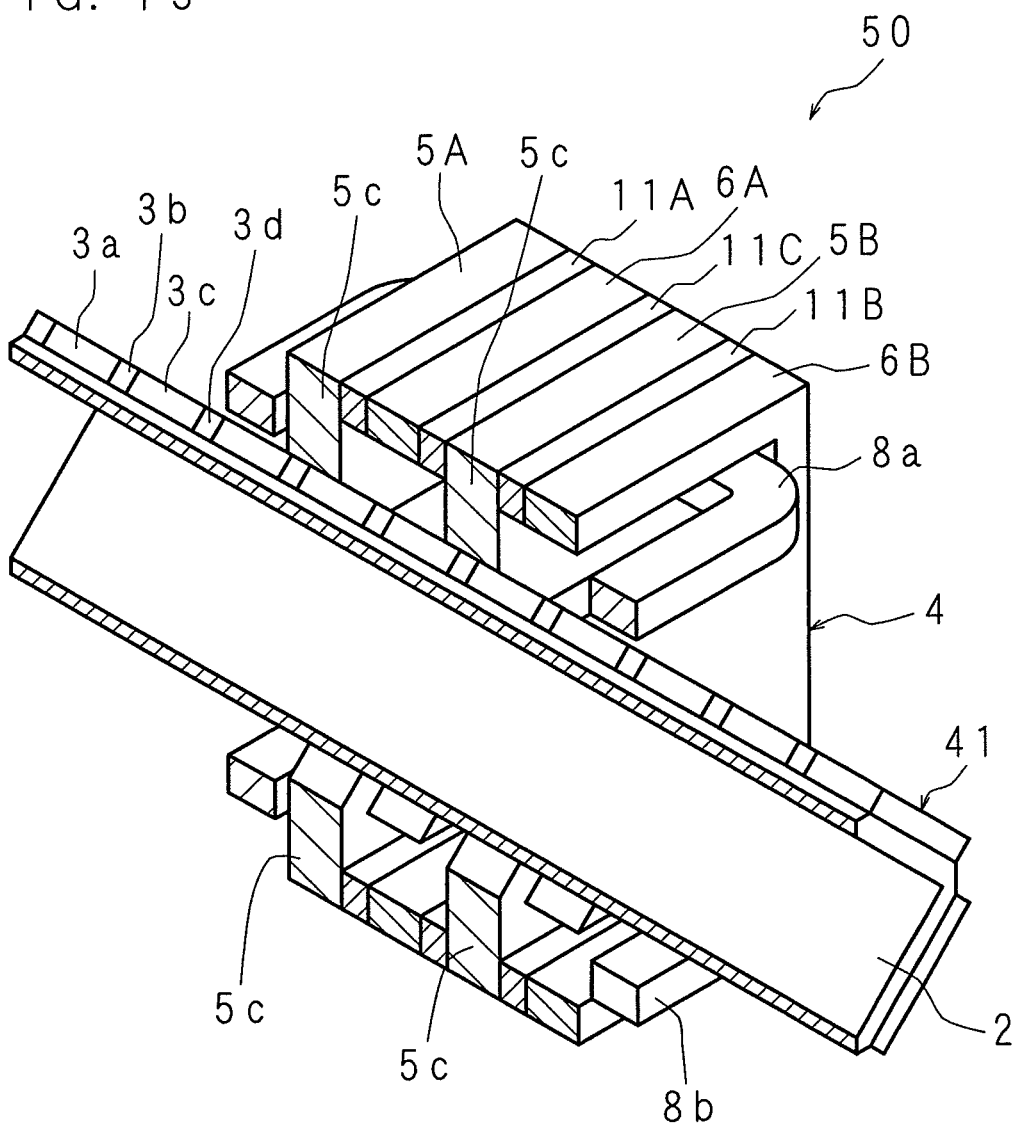
FIG. 13 is a partially broken perspective view illustrating the structure of the linear motor according to the fourth embodiment.

FIG. 12 is a perspective view illustrating a structure of a linear motor 50 according to the fourth embodiment, and FIG. 13 is a partially broken perspective view illustrating the structure of the linear motor 50. An armature 4 is formed by alternately arranging and stacking single pole units and spacer units in the following order: a first single pole unit 5A, a spacer unit 11A, a second single pole unit 6A, a spacer unit 11C, a first single pole unit 5B, a spacer unit 11B and a second single pole unit 6B. Moreover, the foregoing mover 41 illustrated in FIG. 11 is passed through a hollow portion 9 formed by continuous openings 5a and 6a of the armature 4 (see FIG. 3B), thus forming a two-phase drive linear motor 50 according to the fourth embodiment.

In this case, the mover 41 is passed through the hollow portion 9 of the armature 4 so that the upper adjacent outer surfaces 2a and 2b of the inner yoke 2 of the mover 41 are opposed to upper core portions 5c of the first single pole units 5A and 5B (i.e., an upper winding 8a serving as a first winding), and the lower adjacent outer surfaces 2c and 2d of the inner yoke 2 are opposed to lower core portions 5c of the first single pole units 5A and 5B (i.e., a lower winding 8b serving as a second winding).

Further, a sinusoidal wave current is passed through the winding 8a and a cosine wave current is passed through the winding 8b so that an energization phase difference of 90° occurs between the windings 8a and 8b. Also in this linear motor 50, the armature 4 functions as a stator. Currents by which a phase difference of 90° occurs are passed through the windings 8a and 8b, thus making it possible to continuously produce thrust force for the mover 41 passed through the hollow portion 9 of the armature 4, and causing a reciprocating linear motion of the mover 41 with respect to the armature 4 (stator). In this case, thrust force peaks can be obtained alternately at the upper and lower core portions 5c of the armature 4, thereby making it possible to obtain continuous thrust force by a single core unit and to implement the two-phase drive linear motor 50.

In the three-phase independent type linear motor according to the first or third embodiment described above, the three armatures are necessary, and interphase space for phase adjustment has to be provided between the armatures adjacent to each other, thus causing a problem that the resulting total length is increased. On the other hand, in the linear motor according to the fourth embodiment described above, a movement of the mover is enabled with the use of a single armature, and therefore, the resulting total length can be considerably reduced. Hence, the linear motor can be used even in a narrow region, thereby increasing the range of use of the linear motor.

Naturally, the fourth embodiment also has advantages similar to those described in the first and third embodiments. Specifically, since the spacer units 11A, 11B and 11C are inserted between the adjacent single pole units, the thickness of the core portion in each single, pole unit does not have to be smaller than that of the yoke portion and thus no additional process is necessary, so that the use of the single pole units having a uniform thickness as a whole is enabled, thereby simplifying a fabrication process. Furthermore, in a conventional cylindrical linear motor that uses, for example, a structure in which a radially magnetized cylindrical magnet is adhered to a solid inner yoke or a structure in which an axially magnetized cylindrical magnet is adhered to a solid inner yoke, the inner yoke is large and the mass of a mover is increased, thus making it difficult to achieve a high-speed responsiveness. However, in the mover 41 according to the fourth embodiment, the inner yoke 2 is hollow; furthermore, a reduction in magnetic flux generated inside the inner yoke 2 is enabled, and a reduction in thickness of the cornered tubular inner yoke 2 is enabled, thus enabling a reduction in weight of the mover 41. Hence, an increase in the response speed of the mover 41 is enabled.

Besides, examples of methods for reducing the thickness of an inner yoke of a mover include a method for reducing a magnet pole pitch; however, when a pole pitch is reduced, the number of areas where windings are located is increased in a structure of a conventional armature, and the resulting shape tends to increase in size. On the other hand, in the armature 4 according to the fourth embodiment, a winding is not wound for each pole but the windings 8a and 8b are collectively wound; therefore, even when a magnetic pole pitch is small, a winding structure is not complicated but is simply provided, thus facilitating size reduction.

Further, since the mover 41 has a quadrangular cross-sectional shape in the linear motor 50 according to the fourth embodiment, magnets can be provided at four surfaces in a divided manner, and in addition, the use of flat plate magnets is enabled. Hence, as compared with a cylindrical linear motor, fabrication flexibility, including selection of magnets to be used, is extremely high, and the fabrication of the mover 41 having high rigidity can be easily carried out. In addition, the directions of sides of the openings 5a and 6a of the single pole units 5A and 5B and 6A and 6B are inclined by 45° with respect to the directions of sides of main bodies of the first and second single pole units 5A and 5B and 6A and 6B Hence, the flow of magnetic flux through the armature 4 is smoothed, thus making it difficult to cause magnetic saturation.

Note that although five sets of the flat plate magnets 3a, 3b, 3c and 3d, i.e., a total of twenty flat plate magnets, are provided sequentially in a continuous manner at each outer surface, such a structure is provided by way of example, and the number of the flat plate magnets may be any number. Further, although two sets of the first and second single pole units 5A and 5B and 6A and 6B are alternately arranged, this arrangement is provided by way of example, and the number of sets may be any number. Furthermore, although sinusoidal wave current and cosine wave current are passed through the windings 8a and 8b, respectively, these currents are provided for illustrative purposes, and any current may be passed through each of the windings 8a and 8b as long as a phase difference of an electrical angle of 90° occurs. For example, the waveforms of currents passed through the windings 8a and 8b may be rectangular waveforms or trapezoidal waveforms by which a phase difference of an electrical angle of 90° occurs.

Actually, a two-phase drive linear motor conventionally has a problem that thrust ripple and detent force are increased, and it is feared that this problem might occur also in the fourth embodiment. Hereinafter, methods for reducing thrust ripple and detent force in the fourth embodiment will be described. In the fourth embodiment, the arrangement of the flat plate magnets in the mover 41 and spacing between magnetic pole teeth of the armature 4 are adjusted, thereby reducing thrust ripple and detent force which cause problems in a two-phase drive linear motor.

In a two-phase drive linear motor, harmonic components of thrust ripple and detent force are increased for each of the second-order, fourth-order, sixth-order and eighth-order harmonics. Therefore, ingenious methods for reducing harmonic components of the respective orders will each be described. The following examples are based on the principle that mutual cancellation occurs upon addition of two sinusoidal waves whose phases are deviated by 180° and mutual cancellation occurs upon addition of two cosine waves whose phases are deviated by 180°.

<Reduction of Second-Order and Sixth-Order Harmonic Components>

Figure 14:
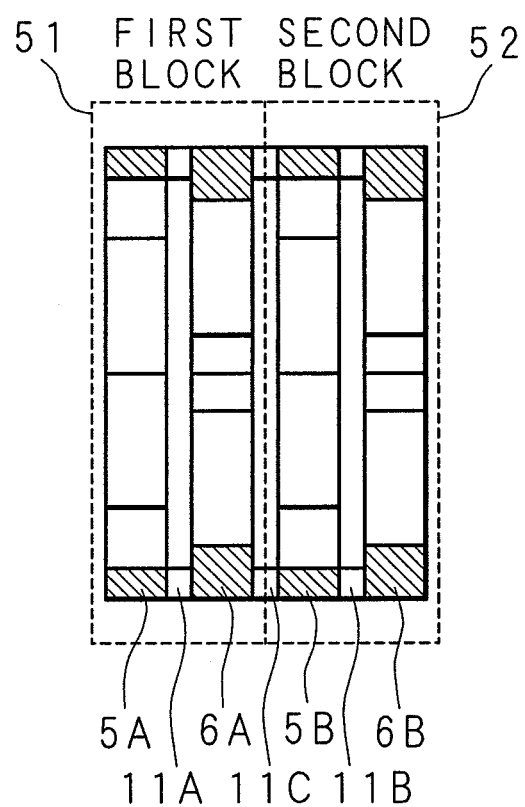
FIG. 14 is a cross-sectional view of a standard armature.

FIG. 14 is a cross-sectional view of a standard armature 4. As mentioned above (see FIGS. 12 and 13), the armature 4 is formed by alternately arranging and combining single pole units and spacer units in the following order: a first single pole unit 5A, a spacer unit 11A, a second single pole unit 6A, a spacer unit 11C, a first single pole unit 5B, a spacer unit 11B and a second single pole unit 6B. In the example of FIG. 14, the three spacer units 11A, 11B and 11C have the same thickness, and the first single pole unit 5A, the second single pole unit 6A, the first single pole unit 5B and the second single pole unit 6B are equidistantly arranged. Note that a set of the first single pole unit 5A, the spacer unit 11A and the second single pole unit 6A will be referred to as a "first block 51", and a set of the first single pole unit 5B, the spacer unit 11B and the second single pole unit 6B will be referred to as a "second block 52".

Figure 15:
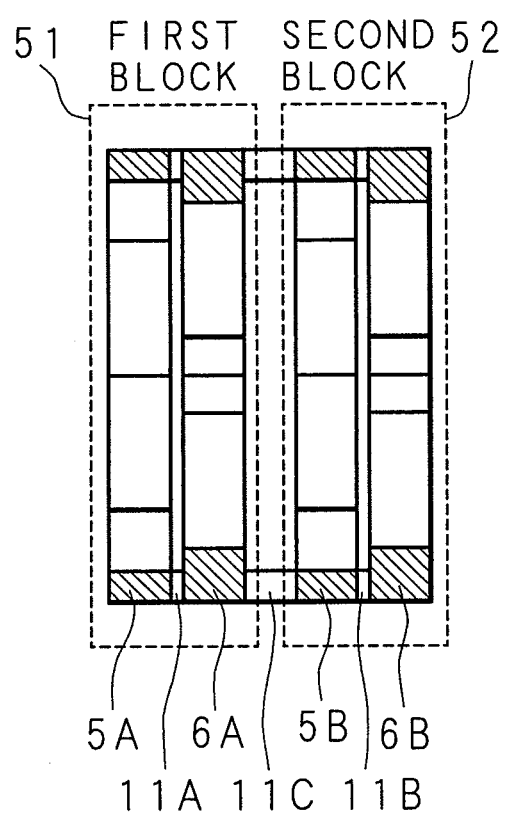
FIG. 15 is a cross-sectional view of an armature for describing a method for reducing second-order and sixth-order harmonic components.

FIG. 15 is a cross-sectional view of the armature 4 for describing a method for reducing second-order and sixth-order harmonic components. In FIG. 15, spacing is extended by an electrical angle of 90° with respect to the equidistant arrangement of the single pole units illustrated in FIG. 14. Specifically, spacing between the first and second blocks 51 and 52 (i.e., spacing between the second single pole unit 6A and the first single pole unit 5B) is extended by an electrical angle of 90° (i.e., by a length of λ/4 where λ denotes a field cycle), and is thus greater than spacing between the first and second single pole units 5A and 6A and spacing between the first and second single pole units 5B and 6B. Such a structure can be easily achieved by increasing the thickness of the spacer unit 11C (i.e., by using a thicker spacer unit 11C) as compared with the example illustrated in FIG. 14.

By extending the spacing between the first and second blocks 51 and 52 by an electrical angle of 90°, a deviation of 180° (=90°×2) occurs for the second-order harmonic, and cancellation occurs due to addition between the first and second blocks 51 and 52, thereby reducing the second-order harmonic component. Further, a deviation of 540° (=90°×6) occurs for the sixth-order harmonic, and cancellation occurs between the blocks, thereby also reducing the sixth-order harmonic component. The spacing between the first and second blocks 51 and 52 (i.e., the spacing between magnetic pole teeth) is adjusted in this manner, thus reducing the second-order and sixth-order harmonic components of thrust ripple and detent force.

<Reduction of Fourth-Order Harmonic Component>

Figure 16:
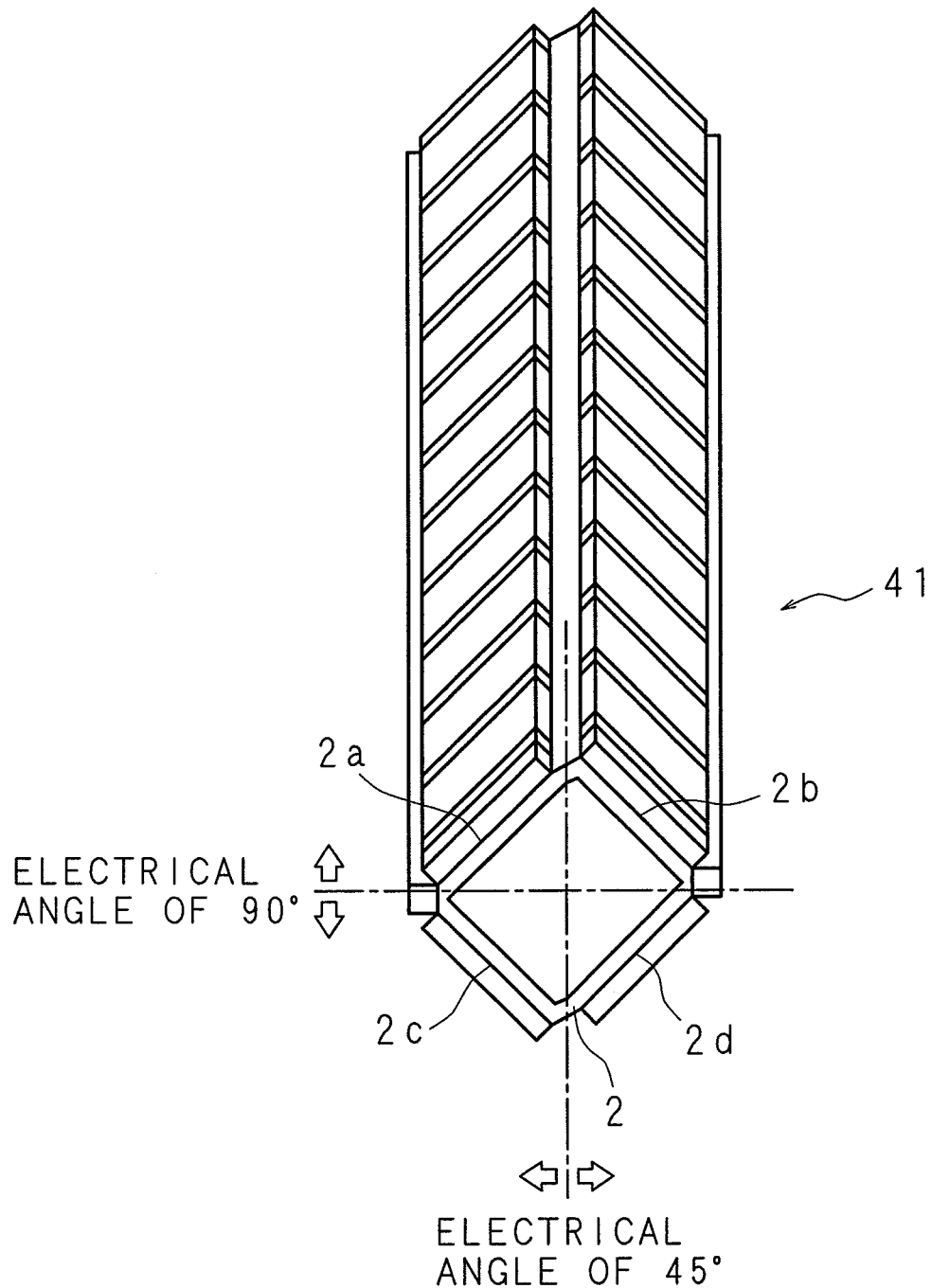
FIG. 16 is a perspective view of a mover for describing a method for reducing a fourth-order harmonic component.

FIG. 16 is a perspective view of the mover 41 for describing a method for reducing a fourth-order harmonic component. While a state where the positions of the flat plate magnets 3a, 3b, 3c and 3d provided at the upper outer surfaces 2a and 2b of the inner yoke 2 and the positions of the flat plate magnets 3a, 3b, 3c and 3d provided at the lower outer surfaces 2c and 2d are deviated from each other by an electrical angle of 90° (i.e., by a length of λ/4) is maintained, the positions of the flat plate magnets 3a, 3b, 3c and 3d provided at the upper outer surface 2a and the positions of the flat plate magnets 3a, 3b, 3c and 3d provided at the upper outer surface 2b are deviated, from each other by an electrical angle of 45° (i.e., by a length of λ/8); in addition, the positions of the flat plate magnets 3a, 3b, 3c and 3d provided at the lower outer surface 2c and the positions of the flat plate magnets 3a, 3b, 3c and 3d provided at the lower outer surface 2d are deviated from each other by an electrical angle of 45° (i.e., by a length of λ/8).

By deviating the positions of the flat plate magnets provided at the adjacent outer surfaces by an electrical angle of 45°, a deviation of 180° (=45°×4) occurs for the fourth-order harmonic, and cancellation occurs due to addition between the adjacent outer surfaces, thereby reducing the fourth-order harmonic component. The positions of the flat plate magnets 3a, 3b, 3c and 3d provided at the outer surfaces of the inner yoke 2 are adjusted in this manner, thus reducing each fourth-order harmonic component of thrust ripple and detent force.

<Reduction of Eighth-Order Harmonic Component>

Figure 17:
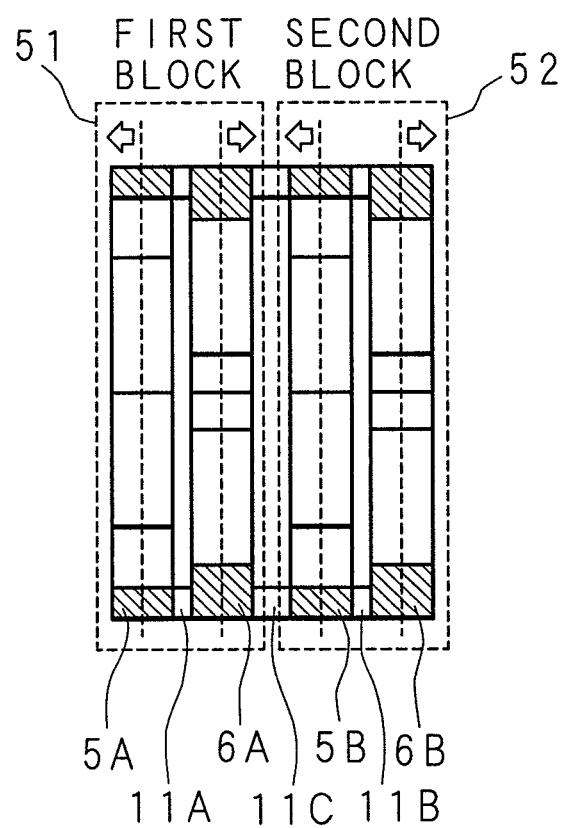
FIG. 17 is a cross-sectional view of an armature for describing a method for reducing an eighth-order harmonic component.

FIG. 17 is a cross-sectional view of the armature 4 for describing a method for reducing an eighth-order harmonic component. The spacing between the first and second single pole units 5A and 6A and the spacing between the first and second single pole units 5B and 6B are each extended (see open arrows) by an electrical angle of 22.5° (i.e., by a length of λ/16) without any change in centers of gravity of the first and second blocks 51 and 52 after the above-described adjustment of the thickness of the spacer unit 11C, which is illustrated in FIG. 15. Such a structure can be easily achieved by increasing the thicknesses of the spacer units 11A and 11B (i.e., by using thicker spacer units 11A and 11B).

By extending the spacing between the first and second single pole units by an electrical angle of 22.5°, a deviation of 180° (=22.5°×8) occurs for the eighth-order harmonic, and cancellation occurs due to addition between the adjacent single pole units, thereby reducing the eighth-order harmonic component. The spacing between the first and second single pole units (i.e., the spacing between magnetic pole teeth) in both of the blocks is adjusted in this manner, thus reducing the eighth-order harmonic component of thrust ripple and detent force.

Note that the foregoing method (first reduction method) is provided by way of example, and methods for reducing harmonic components of the respective orders of thrust ripple and detent force are not limited to the foregoing method;

alternatively, other methods may be used. Other methods for reducing harmonic components of the respective orders will be described below.

(Second Reduction Method)

In this method, the second-order and sixth-order harmonic components of thrust ripple and detent force are reduced by adjusting the magnet arrangement of the mover, the fourth-order harmonic component is reduced by adjusting the spacing between the blocks of the armature, and the eighth-order harmonic component is reduced by adjusting the spacing between the first and second single pole units in each block.

(Third Reduction Method)

In this method, the second-order and sixth-order harmonic components of thrust ripple and detent force are reduced by adjusting the spacing between the blocks of the armature, the fourth-order harmonic component is reduced by adjusting the spacing between the first and second single pole units in each block, and the eighth-order harmonic component is reduced by adjusting the magnet arrangement of the mover.

(Fifth Embodiment)

In the fourth embodiment, the flat plate magnets 3b and 3d magnetized in the axial direction of the mover may be removed similarly to the third embodiment.

Specifically, the mover is formed so that the two types of the flat plate magnets 3a and 3c are alternately provided in this order at each of the outer surfaces 2a to 2d of the quadrangular tubular inner yoke 2, made of a soft magnetic material, along the axial direction of the inner yoke 2 (i.e., along the movement direction of the mover), and the positions of the flat plate magnets 3a and 3c provided at the upper outer surfaces 2a and 2b of the inner yoke 2, and the positions of the flat plate magnets 3a and 3c provided at the lower outer surfaces 2c and 2d of the inner yoke 2 are deviated from each other, by a dimension equal to or less than ¼ of a length of one set of the two types of the flat plate magnets 3a and 3c (i.e., by λ/4 where λ denotes a field cycle, or by an electrical angle of 90°).

Further, in order to reduce the second-order, fourth-order, sixth-order and eighth-order harmonic components of thrust ripple and detent force, similarly to the fourth embodiment described, above, the following measures are taken. While a state where the positions of the flat plate magnets 3a and 3c provided at the upper outer surfaces 2a and 2b of the inner yoke 2 and the positions of the flat plate magnets 3a and 3c provided at the lower outer surfaces 2c and 2d are deviated from each other by an electrical angle of 90° is maintained, the positions of the flat plate magnets 3a and 3c provided at the upper outer surface 2a and the positions of the flat plate magnets 3a and 3c provided at the upper outer surface 2b are deviated from each other by a predetermined electrical angle (by 90° for the second-order and sixth-order harmonic components, by 45° for the fourth-order harmonic component, and by 22.5° for the eighth-order harmonic component); in addition, the positions of the flat plate magnets 3a and 3c provided at the lower outer surface 2c and the positions of the flat plate magnets 3a and 3c provided at the lower outer surface 2d are deviated, from each other by a predetermined electrical angle (by 90° for the second-order and sixth-order harmonic components, by 45° for the fourth-order harmonic component, and by 22.5° for the eighth-order harmonic component).

Note that also in the foregoing fourth and fifth embodiments, similarly to the second embodiment, linear guide rails 12 may be provided at two corner portions of the outer surfaces of the inner yoke 2 of the mover 41 so as to be extended (see FIG. 7), and cut-outs for allowing the linear guide rails 12 to pass through the openings of the first and second single pole units 5 and 6 constituting the armature 4 may be provided.

Hereinafter, specific structures of linear motors fabricated by the present inventor and characteristics of the fabricated linear motors will be described.

(Example of First Embodiment)

First, as the mover 1 used for a linear motor, a mover including a quadrangular tubular inner yoke and flat plate permanent magnets as illustrated in FIG. 1 was fabricated. The inner yoke 2 to be used is made of pure iron and has a quadrangular tubular form with an outer shape of 22 mm per side and an inner shape of 18 mm per side.

Ten sets of the flat plate magnets 3a, 3b, 3c and 3d, in which each set includes the four types of the flat plate magnets 3a, 3b, 3c and 3d, are adhered to each of the four outer surfaces of the foregoing inner yoke 2 so as to be continuous in the axial direction of the inner yoke 2 (i.e., in the movement direction of the mover 1). Each flat plate magnet 3a is a permanent magnet having a length of 10 mm, a width of 22 mm and a height of 4 mm and magnetized from inside (axial center of the movement direction) to outside in a height direction of the mover 1, and each flat plate magnet 3c is a permanent magnet having a length of 10 mm, a width of 22 mm and a height of 4 mm and magnetized from outside to inside in the height direction of the mover 1. The magnetization directions of the flat plate magnets 3a and 3c correspond to the height direction (i.e., the direction perpendicular to the outer surface of the inner yoke 2) but are opposite to each other (see the open arrows in FIG. 1).

Furthermore, each flat plate magnet 3b is a permanent magnet having a length of 2 mm, a width of 22 mm and a height of 4 mm and magnetized from the flat plate magnet 3c to the flat plate magnet 3a in a longitudinal direction of the mover 1, and each flat plate magnet 3d is a permanent magnet having a length of 2 mm, a width of 22 mm and a height of 4 mm and magnetized from the flat plate magnet 3c to the flat plate magnet 3a in the longitudinal direction of the mover 1. The magnetization directions of the flat plate magnets 3b and 3d correspond to the longitudinal direction (i.e., the movement direction of the mover 1) but are opposite to each other (see the open arrows in FIG. 1).

Hence, a length of the ten sets of the flat plate magnets 3a, 3b, 3c and 3d, i.e., a total of forty flat plate magnets which are continuous with each other, is 240 mm (=(10 mm+2 mm+10 mm+2 mm)×10). The positions of the flat plate magnets 3a, 3b, 3c and 3d provided at the adjacent outer surfaces of the inner yoke 2 are deviated from each other by a length of the flat plate magnet 3b or 3d (2 mm).

Figure 18A:
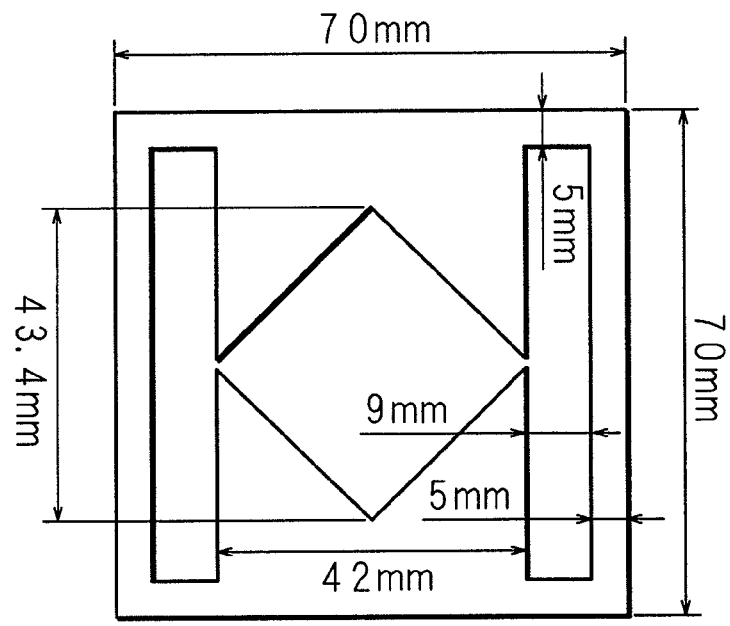
FIG. 18A is a plan view illustrating an armature material used for fabrication of the armature according to the first embodiment.
Figure 18B:
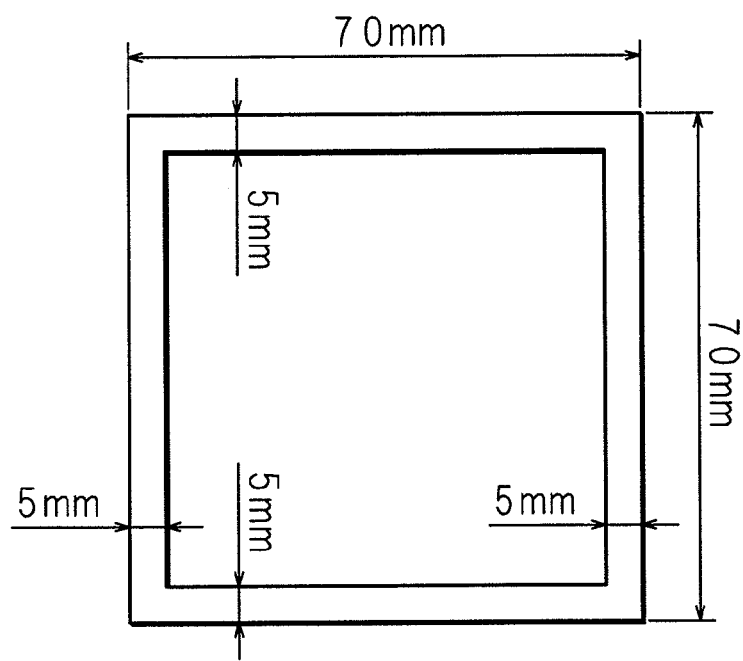
FIG. 18B is a plan view illustrating an armature material used for fabrication of the armature according to the first embodiment.

Next, the armature 4 was fabricated. Sixteen armature materials each having a shape illustrated in FIG. 18A were cut out from a silicon steel plate having a thickness of 0.5 mm, and the cut-out sixteen armature materials were stacked and adhered to each other, thus fabricating the first single pole unit 5 or second single pole unit 6 having a thickness of 8 mm (see FIGS. 2A and 2B). Further, eight armature materials each having a shape illustrated in FIG. 18B were cut out from a silicon steel plate having a thickness of 0.5 mm, and the cut-out eight armature materials were stacked and adhered to each other, thus fabricating the spacer unit 11 having a thickness of 4 mm (see FIG. 2C).

A single-phase unit (see FIG. 3A) was formed by stacking the respective units fabricated as described above in the following order: the first single pole unit 5, the spacer unit 11, the second single pole unit 6, the spacer unit 11, the first single pole unit 5, the spacer unit 11, and the second single pole unit 6. This single-phase unit has a thickness of 44 mm (=8 mm×4+4 mm×3). Furthermore, a magnetic pole pitch is 12 mm (=8 mm+4 mm).

For the single-phase unit, the windings 8a and 8b serving as drive coils are provided as follows. Through gap portions at four corners, a polyimide tape was wound around portions of an armature core, where the windings are to be wound, in order to ensure insulation, and a conductor was wound 100 turns over the tape at each of two areas (see FIG. 3B). Then, serial connection was made so that directions of currents are opposite to each other upon energization.

The three armatures 4 fabricated in this manner were prepared, the three armatures 4 were linearly arranged at intervals of 20 mm (=12 mm×(1+⅔)), the mover 1 was inserted into the center hollow portion (see FIG. 4), and the armatures 4 were fixed to a test bench so that the mover 1 was movable in the longitudinal direction without coming into contact with the armatures 4.

One ends of a pair of the drive coils wound around the three armatures 4 were connected to each other, and the other ends thereof were connected with U, V and W phases of a three-phase power source, thereby providing a star connection and making a connection to a motor controller. Furthermore, an optical linear scale was adhered to a tip portion of the mover 1, and a linear encoder was attached to a region fixed to the test bench, thereby allowing the position of the mover 1 to be read. Moreover, a position signal detected by the linear encoder was outputted to the motor controller to control the position of the mover 1.

Figure 19:
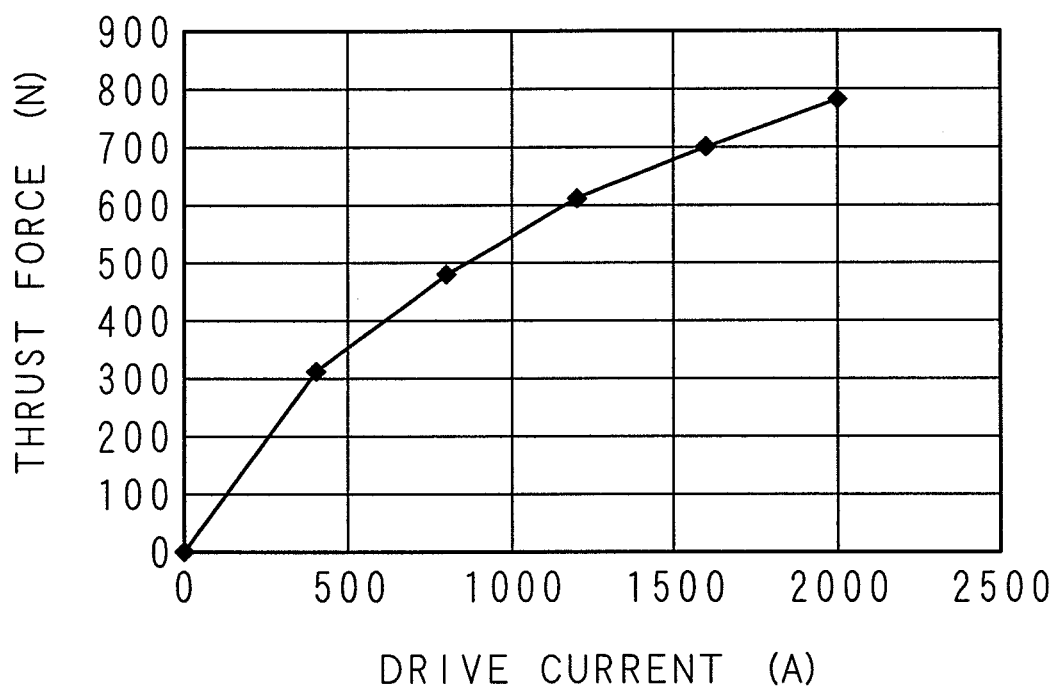
FIG. 19 is a graph illustrating results of measurement of thrust characteristics in the linear motor according to the first embodiment.

After the connections were made as described above, the thrust force of the mover 1 was measured while drive current applied to the drive coils was changed. In this case, the thrust force was measured using a method in which a force gage was pressed against the mover 1. Results of the measurement are illustrated in FIG. 19. The horizontal axis in FIG. 19 represents a value obtained by the following expression: an rms value of the drive current×the number of turns of the coils per phase of the armature.

As illustrated in FIG. 19, a maximum thrust force of more than 700 N was obtained. Since the mass of the mover 1 was 1.1 kg, a thrust force/mover mass ratio was 637 N/kg. In a conventional linear motor operated in the other mode in which a thrust force of 700 N is obtained (Japanese Patent Application Laid-Open No. 2002-359962), the mass of a mover has to be 3 kg or more, and therefore, a thrust force/mover mass ratio is 233 N/kg or less. In obtaining the same level of thrust force, the linear motor of the present invention is capable of reducing the mass of the mover to about ⅓ as compared with the conventional linear motor. Thus, the present invention can provide a linear motor extremely effective in performing a high-speed process in a finishing machine or the like.

(Example of Fourth Embodiment)

Figure 20A:
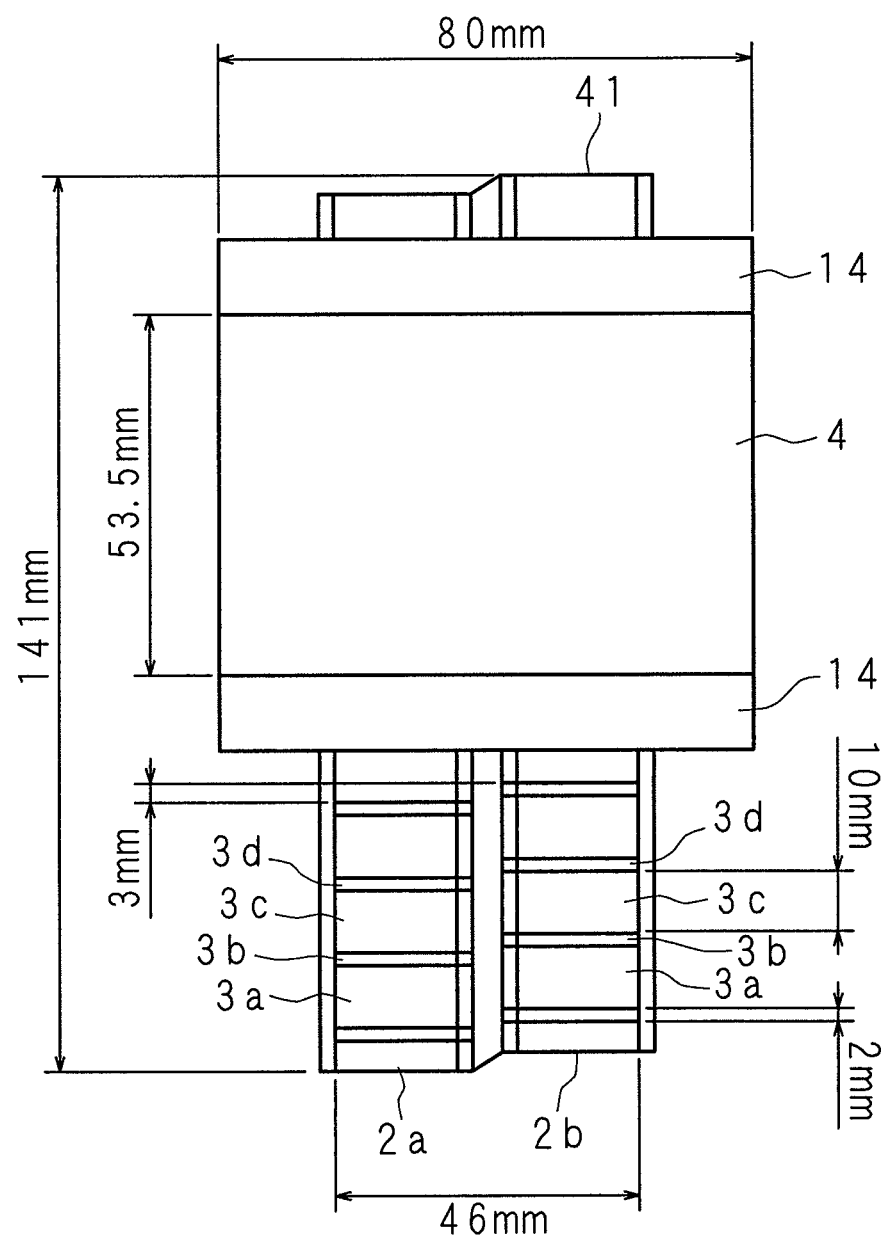
FIG. 20A is a top view illustrating a state in which the mover according to the fourth embodiment is passed through the armature.
Figure 20B:
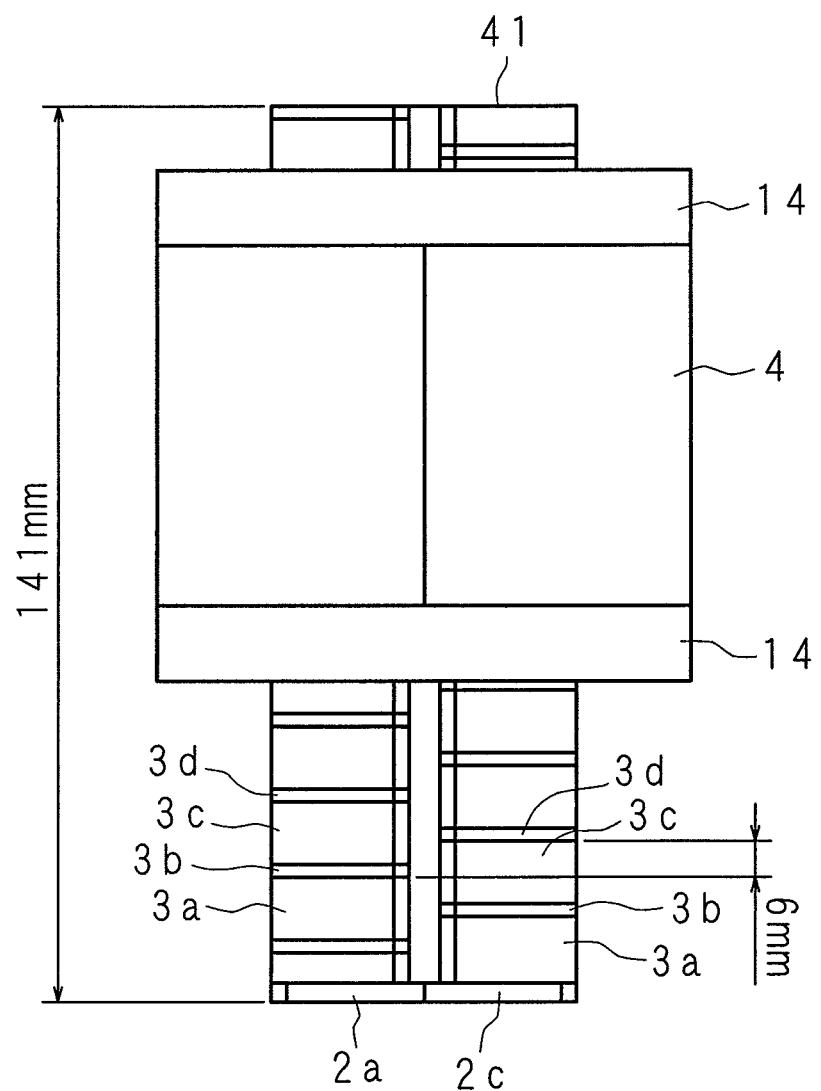
FIG. 20B is a side view illustrating the state in which the mover according to the fourth embodiment is passed through the armature.
Figure 20C:
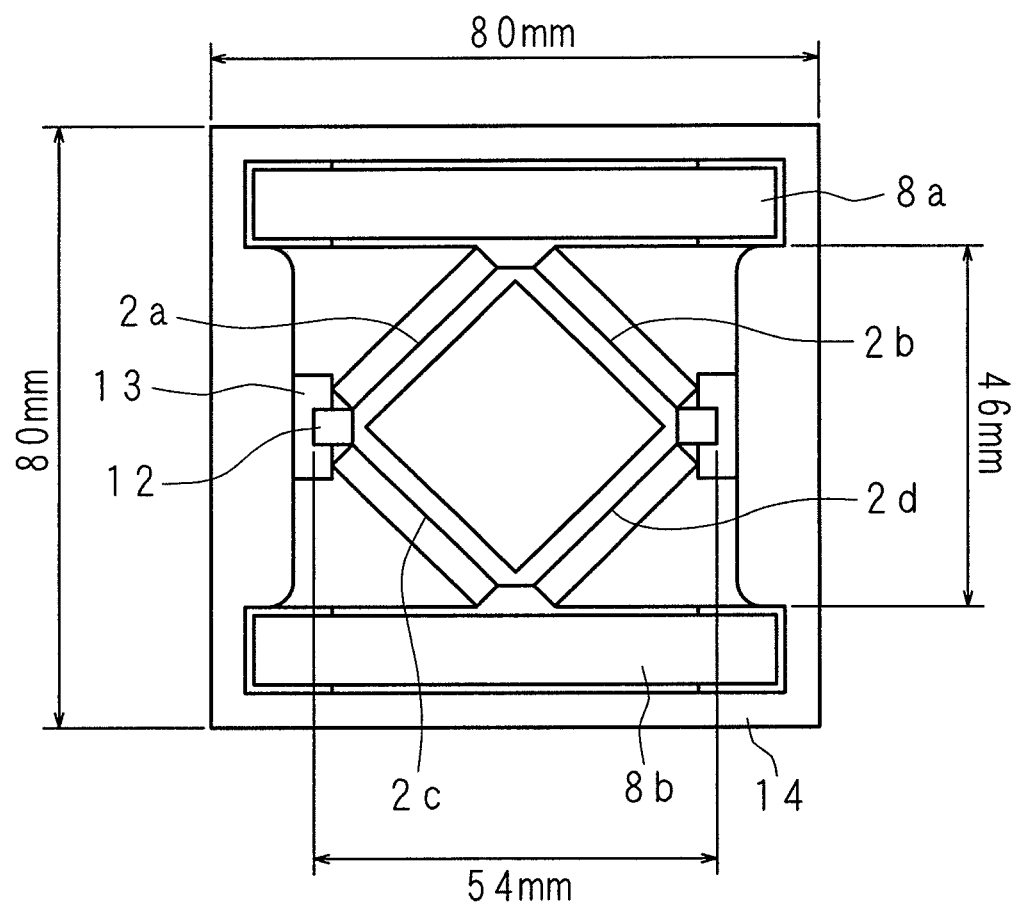
FIG. 20C is a cross-sectional view illustrating the state in which the mover according to the fourth embodiment is passed through the armature.

An example of the fourth embodiment in which two-phase drive is carried out by a single core unit will be described. FIGS. 20A, 20B and 20C are a top view, a side view and a cross-sectional view illustrating a state in which the mover 41 is passed through the armature 4. In this example, the linear guide rails 12, linear guide sliders 13 and mover support frames 14, which have been described, in the second embodiment, are provided.

First, as the mover 41 used for a linear motor, a mover including a quadrangular tubular inner yoke and flat plate permanent magnets as illustrated in FIG. 11 was fabricated. The inner yoke 2 to be used is made of pure iron and has a quadrangular tubular form with an outer shape of 32 mm per side and an inner shape of 26 mm per side.

A plurality of sets of the flat plate magnets 3a, 3b, 3c and 3d, in which each set includes the four types of the flat plate magnets 3a, 3b, 3c and 3d, are adhered to each of the four outer surfaces 2a to 2d of the foregoing inner yoke 2 so as to be continuous in the axial direction of the inner yoke 2 (i.e., in the movement direction of the mover 41). Each flat plate magnet 3a is a permanent magnet having a length of 10 mm, a width of 25 mm and a height of 4 mm and magnetized from inside (axial center of the movement direction) to outside in a height direction of the mover 41, and each flat plate magnet 3c is a permanent magnet having a length of 10 mm, a width of 25 mm and a height of 4 mm and magnetized from outside to inside in the height direction of the mover 41. The magnetization directions of the flat plate magnets 3a and 3c correspond to the height direction (i.e., the direction perpendicular to the outer surface of the inner yoke 2) but are opposite to each other (see the open arrows in FIG. 11).

Furthermore, each flat plate magnet 3b is a permanent magnet having a length of 2 mm, a width of 25 mm and a height of 4 mm and magnetized from the flat, plate magnet 3c to the flat plate magnet 3a in a longitudinal direction of the mover 41, and each flat plate magnet 3d is a permanent magnet having a length of 2 mm, a width of 25 mm and a height of 4 mm and magnetized from the flat plate magnet 3c to the flat plate magnet 3a in the longitudinal direction of the mover 41. The magnetization directions of the flat plate magnets 3b and 3d correspond to the longitudinal direction (i.e., the movement direction of the mover 41) but are opposite to each other (see the open arrows in FIG. 11).

The positions of the flat plate magnets 3a, 3b, 3c and 3d provided at the upper adjacent outer surfaces 2a and 2b of the inner yoke 2, and the positions of the flat plate magnets 3a, 3b, 3c and 3d provided at the lower adjacent outer surfaces 2c and 2d of the inner yoke 2 are deviated from each other by 6 mm in the movement direction (axial direction) of the mover 41. A total length of one set of the four types of the flat plate magnets 3a, 3b, 3c and 3d is 24 mm, and the deviation of 6 mm corresponds to a deviation equivalent to a dimension of ¼ of a magnet arrangement cycle of 24 mm, which is a field cycle ($\lambda$) ($\lambda$/4: an electrical angle of 90°).

Moreover, the positions of the flat plate magnets 3a, 3b, 3c and 3d provided at the upper outer surface 2a and the positions of the flat plate magnets 3a, 3b, 3c and 3d provided at the upper outer surface 2b are deviated from each other by 3 mm in the movement direction of the mover 41, and the positions of the flat plate magnets 3a, 3b, 3c and 3d provided at the lower outer surface 2c and the positions of the flat plate magnets 3a, 3b, 3c and 3d provided at the lower outer surface 2d are deviated from each other by 3 mm in the movement direction of the mover 41. The deviation of 3 mm corresponds to a deviation equivalent to an electrical angle of 45° (i.e., a dimension of $\lambda$/8, which is ⅛ of a field cycle ($\lambda$) of 24 mm) described with reference to FIG. 16. Thus, the mover 41 having a length of 141 mm, a width of 25 mm and a height of 4 mm was fabricated.

Figure 21A:
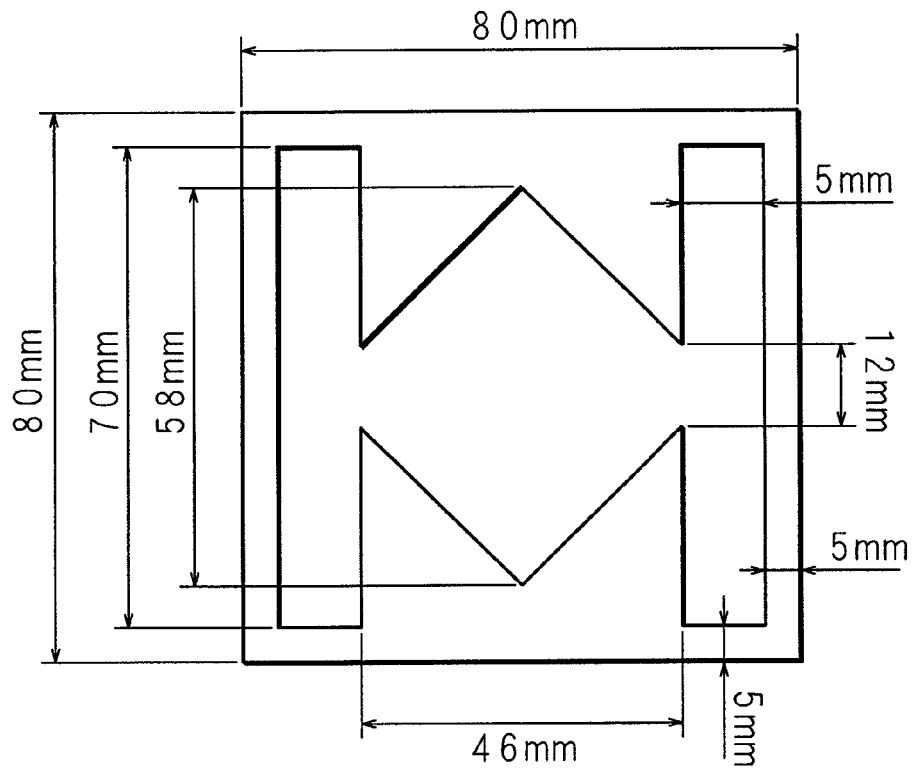
FIG. 21A is a plane view illustrating an armature material used for fabrication of the armature according to the fourth embodiment.
Figure 21B:
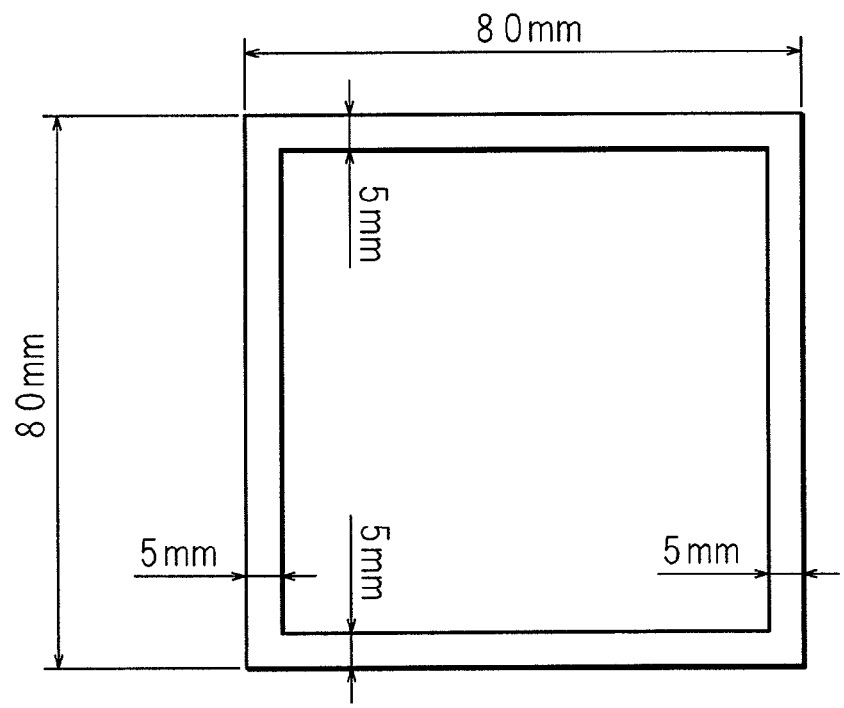
FIG. 21B is a plane view illustrating an armature material used for fabrication of the armature according to the fourth embodiment.

Next, the armature 4 was fabricated. Armature materials each having a shape illustrated in FIG. 21A were cut out from a silicon steel plate having a thickness of 0.5 mm, and the cut-out twenty armature materials were stacked and adhered to each other, thus fabricating the first single pole unit 5 (5A or 5B) or second single pole unit 6 (6A or 6B) having a thickness of 10 mm. Further, armature materials each having a shape illustrated in FIG. 21B were cut out from a silicon steel plate having a thickness of 0.5 mm, and the cut-out seven armature materials were stacked and adhered to each other, thus fabricating each of the two spacer units 11 (spacer units 11A and 11B) each having a thickness of 3.5 mm; in addition, the cut-out thirteen armature materials were stacked and adhered to each other, thus fabricating the single spacer unit 11 (spacer unit 11C) having a thickness of 6.5 mm.

A core unit having a length of 80 mm, a width of 80 mm and a height of 53.5 mm (=10 mm×4+3.5 mm×2+6.5 mm×1) was formed by stacking the respective units fabricated as described above in the following order: the first single pole unit 5A, the spacer unit 11A, the second single pole unit 6A, the spacer unit 11C, the first single pole unit 5B, the spacer unit 11B, and the second single pole unit 6B. Note that the thicknesses of the foregoing spacer units 11A, 11B and 11C are appropriately set with the aim of reducing the second-order, sixth-order and eighth-order harmonic components of thrust ripple and detent force and in order to adjust the spacing between the magnetic pole teeth described with reference to FIGS. 15 and 17.

Figure 22:
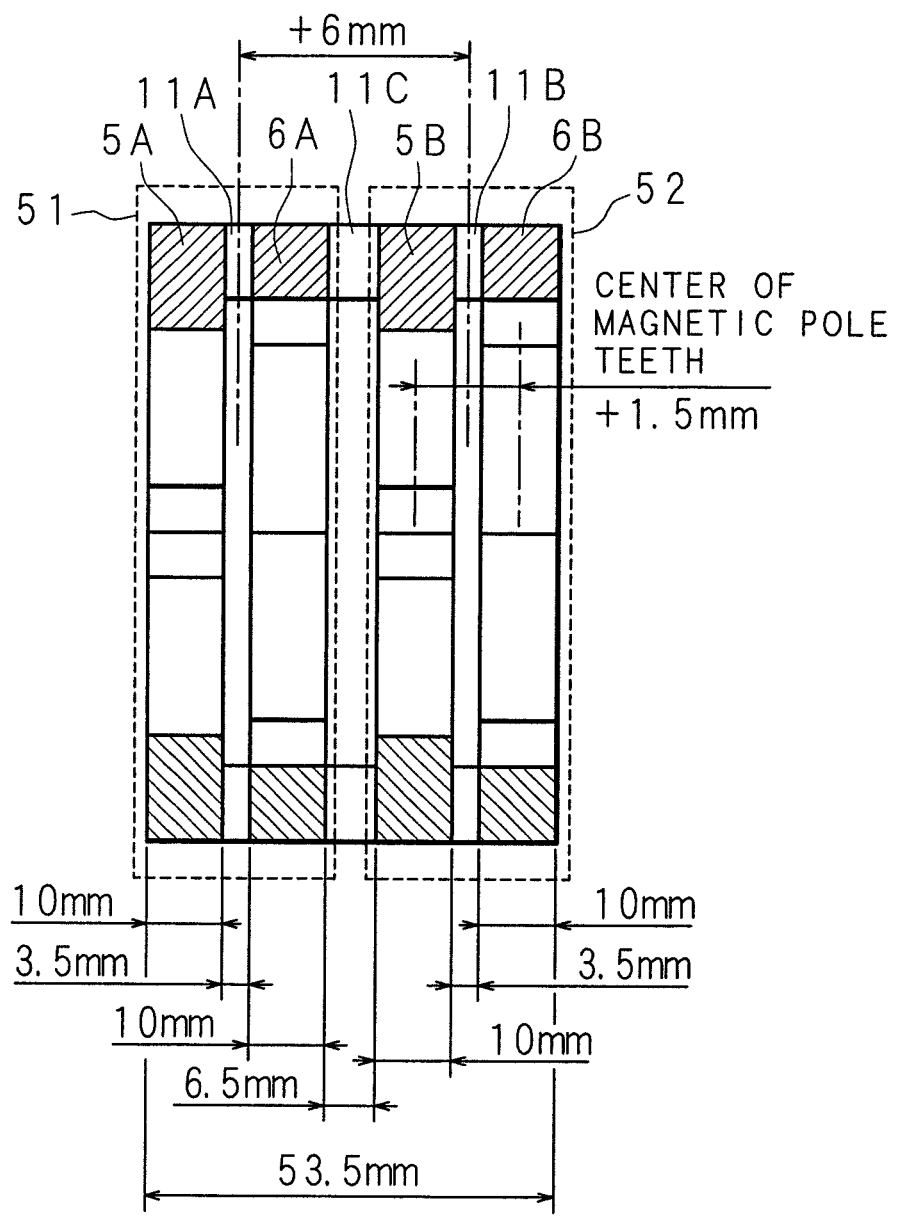
FIG. 22 is a cross-sectional view illustrating a core unit provided by a first harmonic component reduction method.

FIG. 22 provides a cross-sectional view of a core unit provided by the first reduction method. In this example, with the aim of reducing the second-order and sixth-order harmonic components of thrust ripple and detent force, the spacing between the blocks 51 and 52 is extended by 6 mm equivalent to $\lambda/4$ (electrical angle of 90°) where the field cycle is represented by $\lambda$ (=24 mm); furthermore, with the aim of reducing the eighth-order harmonic component, the spacing between the first and second single pole units 5A and 6A and the spacing between the first and second single pole units 5B and 6B (i.e., the spacing between magnetic pole teeth) in the respective blocks 51 and 52 are each extended by 1.5 mm equivalent to $\lambda/16$ (electrical angle of 22.5°). As a result, when the thickness of a basic spacer unit is 2 mm, the thicknesses of the spacer units 11A and 11B are each set at 3.5 mm, and the thickness of the spacer unit 11C is set at 6.5 mm.

For the core unit, the windings 8a and 8b serving as drive coils are provided as follows. Through gap portions at four corners, a polyimide tape was wound around portions of an armature core, where the windings are to be wound, in order to ensure insulation, and a conductor was wound 100 turns over the tape at each of two areas. Then, sinusoidal wave drive current and cosine wave drive current are applied to the windings 8a and 8b, respectively.

Figure 23:
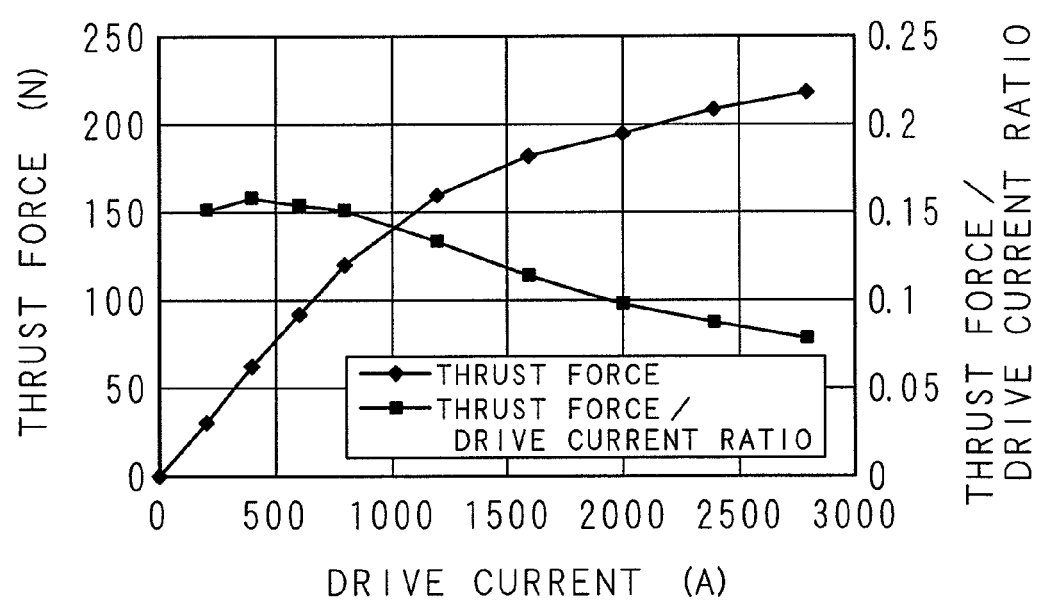
FIG. 23 is a graph illustrating results of measurement of thrust characteristics in the linear motor according to the fourth embodiment.

The two drive coils of the armature described above were connected to a two-phase drive motor controller, a position sensor was attached to a tip of the mover, and a position signal is inputted to the two-phase drive motor controller, thereby measuring thrust characteristics of the linear motor. Results of the measurement are illustrated in FIG. 23. The horizontal axis in FIG. 23 represents a value obtained by the following expression: an rms value of the drive current×the number of turns of the coils.

As illustrated in FIG. 23, a thrust force of about 160 N is obtained in a range in which the thrust force is proportional to the drive current, and a maximum thrust force of more than 200 N is obtained. In the fourth embodiment, such excellent characteristics are achieved with the use of the armature having a total length of only about 65 mm.

In the phase independent type linear motor serving as a conventional example (Japanese Patent Application Laid-open No. 2008-228545) or the foregoing three-phase drive linear motor, an armature needs to have a total length of about 150 mm in order to obtain thrust characteristics similar to those obtained in the fourth embodiment, but in the fourth embodiment, the total armature length can be reduced by one-half or more. Since size reduction and space saving can be achieved as described above, the linear motor according to the fourth embodiment is most suitable for use in a superposed manner as in an X-Y-Z-axis triaxial drive stage.

(Example of Second Reduction Method)

In the second reduction method, the second-order and sixth-order harmonic components of thrust ripple and detent force are reduced by adjusting the magnet arrangement of the mover 41, the fourth-order harmonic component is reduced by adjusting the spacing between the blocks 51 and 52 of the armature 4, and the eighth-order harmonic component is reduced by adjusting the spacing between the first and second single pole units 5A and 6A in the block 51 and the spacing between the first and second single pole units 5B and 6B in the block 52.

The positions of the flat plate magnets 3a, 3b, 3c and 3d provided at the upper adjacent outer surfaces 2a and 2b of the inner yoke 2, and the positions of the flat plate magnets 3a, 3b, 3c and 3d provided at the lower adjacent outer surfaces 2c and 2d of the inner yoke 2 are deviated from each other by 6 mm ($\lambda/4$: an electrical angle of 90°) in the movement direction (axial direction) of the mover 41; besides, the positions of the flat plate magnets 3a, 3b, 3c and 3d provided at the upper outer surface 2a and the positions of the flat plate magnets 3a, 3b, 3c and 3d provided at the upper outer surface 2b are deviated from each other by 6 mm ($\lambda/4$: an electrical angle of 90°) in the movement direction of the mover 41, and the positions of the flat plate magnets 3a, 3b, 3c and 3d provided at the lower outer surface 2c and the positions of the flat plate magnets 3a, 3b, 3c and 3d provided at the lower outer surface 2d are deviated from each other by 6 mm ($\lambda/4$: an electrical angle of 90°) in the movement direction of the mover 41.

Figure 24:
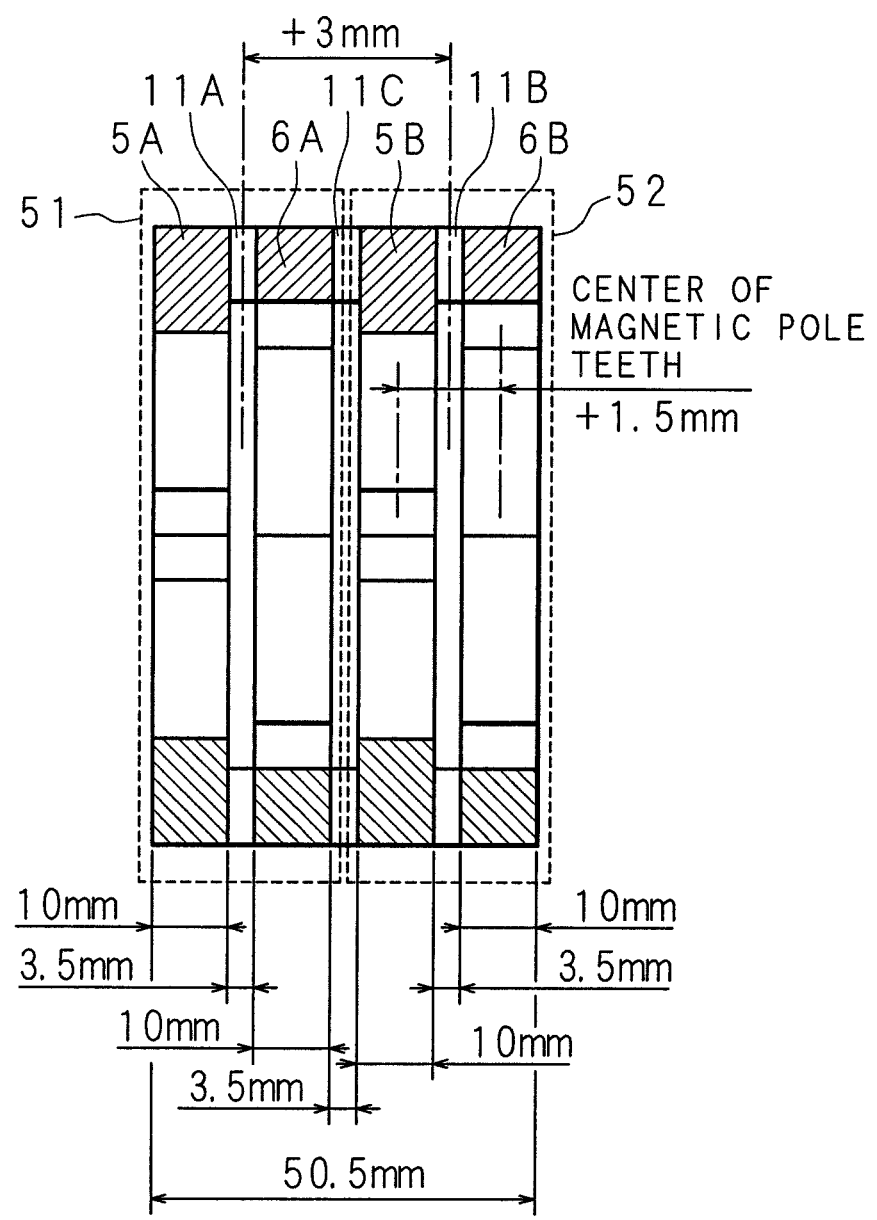
FIG. 24 is a cross-sectional view illustrating a core unit provided by a second harmonic component reduction method.

FIG. 24 provides a cross-sectional view of the core unit provided by the second reduction method. In this example, with the aim of reducing the fourth-order harmonic component of thrust ripple and detent force, the spacing between the blocks 51 and 52 is extended by 3 mm equivalent to $\lambda/8$ (electrical angle of 45°) where the field cycle is represented by $\lambda$ (=24 mm); furthermore, with the aim of reducing the eighth-order harmonic component, the spacing between the first and second single pole units 5A and 6A and the spacing between the first and second single pole units 5B and 6B (i.e., the spacing between magnetic pole teeth) in the respective blocks 51 and 52 are each extended by 1.5 mm equivalent to $\lambda/16$ (electrical angle of 22.5°). As a result, the spacing between magnetic pole teeth is equally extended by 1.5 mm. In this core unit, the spacer units 11A, 11B and 11C each have a thickness of 3.5 mm, and a height of the entire core unit is 50.5 mm (=10 mm×4+3.5 mm×3).

(Example of Third Reduction Method)

In this method, the second-order and sixth-order harmonic components of thrust ripple and detent force are reduced by adjusting the spacing between the blocks 51 and 52 of the armature 4, the fourth-order harmonic component is reduced by adjusting the spacing between the first and second single pole units 5A and 6A in the block 51 and the spacing between the first and second single pole units 5B and 6B in the block 52, and the eighth-order harmonic component is reduced by adjusting the magnet arrangement of the mover 41.

Figure 25:
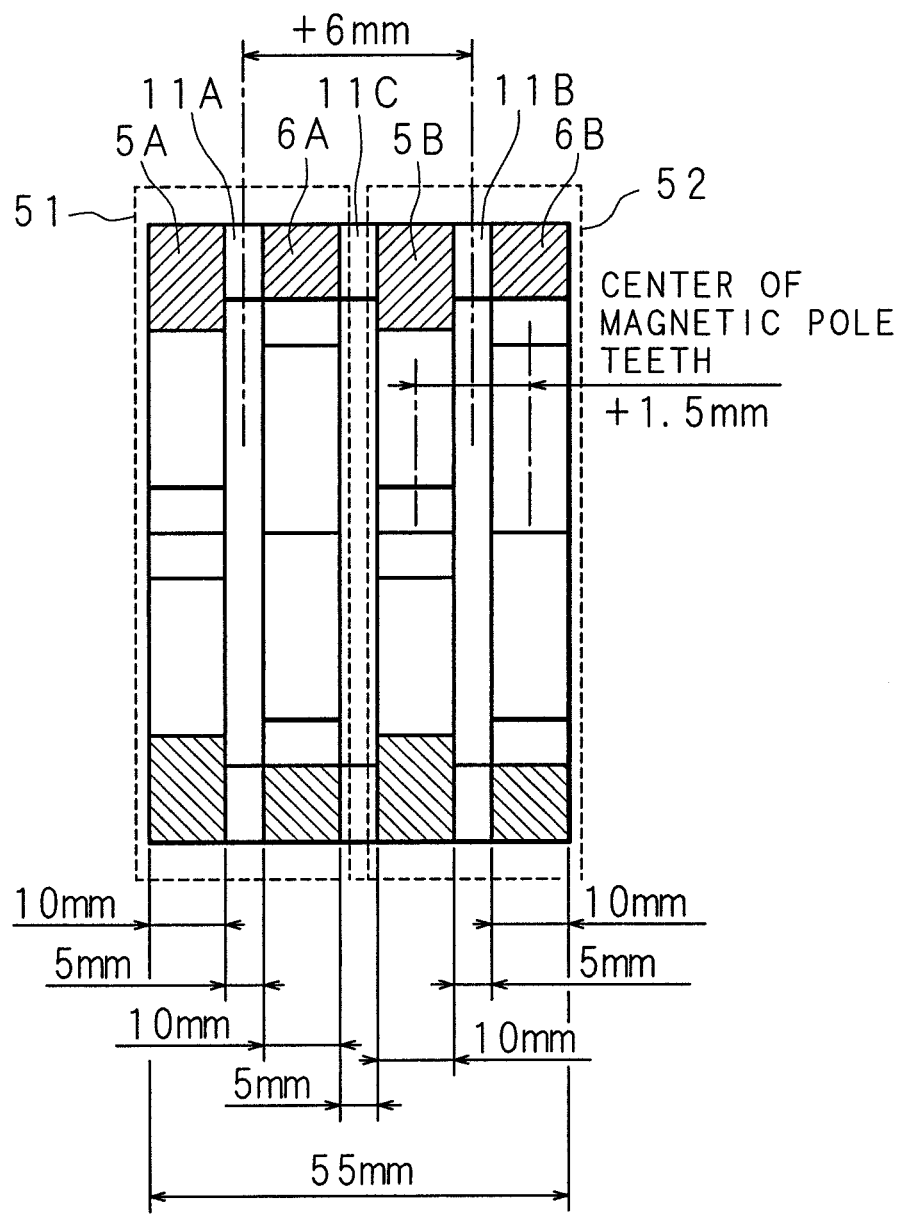
FIG. 25 is a cross-sectional view illustrating a core unit provided by a third harmonic component reduction method.

FIG. 25 provides a cross-sectional view of the core unit provided by the third reduction method. In this example, with the aim of reducing the second-order and sixth-order harmonic components of thrust ripple and detent force, the spacing between the blocks 51 and 52 is extended by 6 mm equivalent to $\lambda/4$ (electrical angle of 90°) where the field cycle is represented by $\lambda$ (=24 mm); furthermore, with the aim of reducing the fourth-order harmonic component, the spacing between the first and second single pole units 5A and 6A and the spacing between the first and second single pole units 5B and 6B (i.e., the spacing between magnetic pole teeth) in the respective blocks 51 and 52 are each extended by 3 mm equivalent to $\lambda/8$, (electrical angle of 45°). As a result, the spacing between magnetic pole teeth is equally extended by 3 mm. In this core unit, the spacer units 11A, 11B and 11C each have a thickness of 5 mm, and a height of the entire core unit is 55 mm (=10 mm×4+5 mm×3).

Moreover, the positions of the flat plate magnets 3a, 3b, 3c and 3d provided at the upper adjacent outer surfaces 2a and 2b of the inner yoke 2, and the positions of the flat plate magnets 3a, 3b, 3c and 3d provided at the lower adjacent outer surfaces 2c and 2d of the inner yoke 2 are deviated from each other by 6 mm ($\lambda/4$: an electrical angle of 90°) in the movement direction (axial direction) of the mover 41; besides, the positions of the flat plate magnets 3a, 3b, 3c and 3d provided at the upper outer surface 2a and the positions of the flat plate magnets 3a, 3b, 3c and 3d provided at the upper outer surface 2b are deviated from each other by 1.5 mm ($\lambda/16$: an electrical angle of 22.5°) in the movement direction of the mover 41, and the positions of the flat plate magnets 3a, 3b, 3c and 3d provided at the lower outer surface 2c and the positions of the flat plate magnets 3a, 3b, 3c and 3d provided at the lower outer surface 2d are deviated from each other by 1.5 mm ($\lambda/16$: an electrical angle of 22.5°) in the movement direction of the mover 41.

(Example of Fifth Embodiment)

Figure 26:
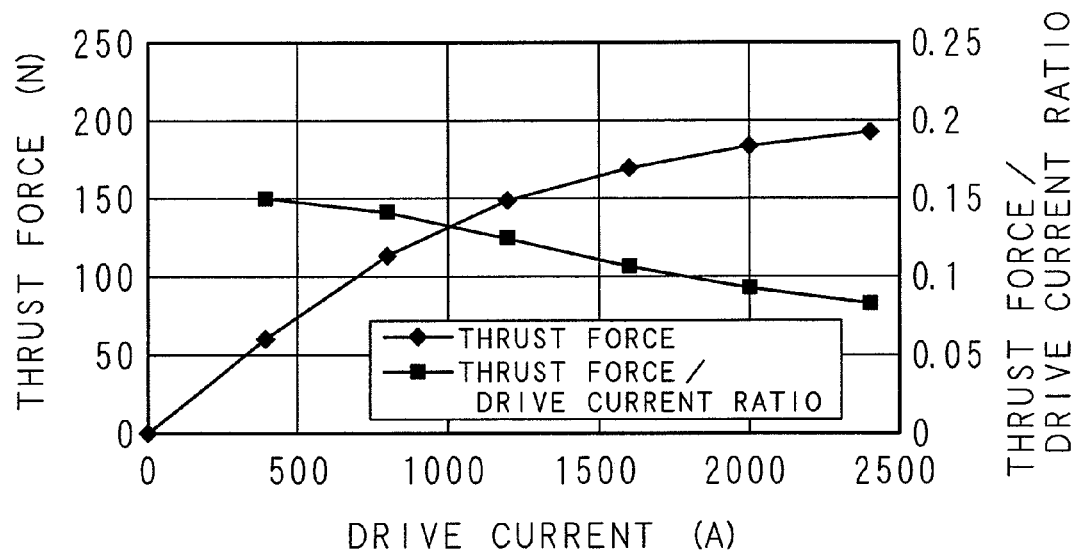
FIG. 26 is a graph illustrating results of measurement of thrust characteristics in a linear motor according to a fifth embodiment.

Two drive coils of the armature fabricated similarly to the example of the fourth embodiment described above were connected to a two-phase motor controller, a position sensor was attached to a tip of the mover, and a position signal is inputted to the two-phase drive motor controller, thereby measuring thrust characteristics of the linear motor. Results of the measurement are illustrated in FIG. 26. The horizontal axis in FIG. 26 represents a value obtained by the following expression: an rms value of the drive current×the number of turns of the coils.

As illustrated in FIG. 26, a thrust force of about 140 N is obtained in a range in which the thrust force is proportional to the drive current. Since flat plate magnets magnetized in the axial direction of the mover are not provided, the value of the thrust force is slightly reduced accordingly as compared with the example of the fourth embodiment (about 160 N). However, compared with a phase independent type linear motor or a three-phase drive linear motor, a shorter length is realized, and size reduction and space saving are achieved.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds, thereof are therefore intended to be embraced by the claims.

What is claimed is:

1. A linear motor comprising:
   a mover in which a plurality of flat plate permanent magnets at outer surfaces of a cornered tubular inner yoke made of a soft magnetic material comprise flat plate magnets magnetized in a direction perpendicular to the outer surface of the inner yoke and flat plate magnets magnetized in an axial direction of the inner yoke, the flat plate magnets magnetized in the perpendicular direction and the flat plate magnets magnetized in the axial direction are alternately and continuously arranged at each outer surface of the inner yoke along the axial direction of the inner yoke, the flat plate magnets magnetized in the perpendicular direction comprise first flat plate magnets magnetized from inside of the inner yoke to outside thereof and second flat plate magnets magnetized from the outside of the inner yoke to the inside thereof, the first and second flat plate magnets are alternately arranged along the axial direction of the inner yoke, the flat plate magnets magnetized in the axial direction are each magnetized from the adjacent second flat plate magnet to the adjacent first flat plate magnet, and positions of the plurality of flat plate permanent magnets provided at the outer surfaces of the inner yoke are deviated from each other; and
   an armature in which the armature comprises a first single pole unit made of a soft magnetic material and having a rectangular opening, a yoke portion located outwardly of the opening, and a core portion extended from the yoke portion to the opening, and a second single pole unit made of a soft magnetic material and having a rectangular opening, a yoke portion located outwardly of the opening, and a core portion that is located at a position rotated by 90° from a position of the core portion of the first single pole unit and that is extended from the yoke portion to the opening, the first and second single pole units are alternately stacked, and windings are wound around a plurality of the core portions of the first single pole unit and/or a plurality of the core portions of the second single pole unit,
   wherein the mover is passed through the opening of the first single pole unit and the opening of the second single pole unit.

2. The linear motor according to claim 1, wherein the inner yoke has a quadrangular tubular shape, the openings each have a quadrangular shape, the first and second single pole units each have a quadrangular shape, and an angle of 45° is formed between a direction of a side of each of the first and second single pole units and a direction of a side of the opening.

3. The linear motor according to claim 1, wherein a spacer made of a soft magnetic material is interposed between the stacked first and second single pole units so that the core portions of the first and second single pole units do not come into contact with each other.

4. The linear motor according to claim 1,
   wherein the inner yoke has a quadrangular tubular shape, and the plurality of flat plate permanent magnets are arranged at each of four outer surfaces of the inner yoke,
   wherein positions of the plurality of flat plate permanent magnets provided at one pair of the adjacent outer surfaces of the inner yoke and positions of the plurality of flat plate permanent magnets provided at the other pair of the adjacent outer surfaces of the inner yoke are deviated from each other by ¼ of a total length of one of the first flat plate magnets, one of the second flat plate magnets and two of the flat plate magnets magnetized in the axial direction,
   wherein the mover is passed through the opening of the first single pole unit and the opening of the second single pole unit so that the plurality of flat plate permanent magnets at said one pair of the outer surfaces are opposed to the first winding and the plurality of flat plate permanent magnets at the other pair of the outer surfaces are opposed to the second winding, and
   wherein currents by which a phase difference of an electrical angle of 90° occurs are applied to the first and second windings.

5. The linear motor according to claim 4, wherein the positions of the plurality of flat plate permanent magnets provided at said one pair of the outer surfaces are deviated from each other, and the positions of the plurality of flat plate permanent magnets provided at the other pair of the outer surfaces are deviated from each other.

6. The linear motor according to claim 4, wherein spacing between the first and second single pole units, which are adjacent to each other, is adjusted.

* * * * *